United States Patent
Sankaranarayanan

(10) Patent No.: US 11,687,568 B2
(45) Date of Patent: Jun. 27, 2023

(54) DATA CATALOG SYSTEM FOR GENERATING SYNTHETIC DATASETS

(71) Applicant: Oracle International Corporation, Redwood Shores, CA (US)

(72) Inventor: Hari Bhaskar Sankaranarayanan, Bengaluru (IN)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 17/377,603

(22) Filed: Jul. 16, 2021

(65) Prior Publication Data
US 2023/0013479 A1   Jan. 19, 2023

(51) Int. Cl.
*G06F 7/00* (2006.01)
*G06F 16/28* (2019.01)
*G06N 20/00* (2019.01)
*G06F 16/23* (2019.01)

(52) U.S. Cl.
CPC ........ *G06F 16/285* (2019.01); *G06F 16/2365* (2019.01); *G06N 20/00* (2019.01)

(58) Field of Classification Search
CPC .... G06F 16/285; G06F 16/2365; G06N 20/00
USPC ................................................. 707/600–899
See application file for complete search history.

(56) References Cited

U.S. PATENT DOCUMENTS

2015/0178167 A1* 6/2015 Kulkarni ............. G06F 11/1446
707/649

OTHER PUBLICATIONS

"A Beginner's Guide to Attention Mechanisms and Memory Networks", Wikipedia, Available Online at: https://wiki.pathmind.com/attention-mechanism-memory-network, Accessed from Internet on: Mar. 2, 2021, 12 pages.
"A Beginner's Guide to Convolutional Neural Networks (CNNs)", Wikipedia, Available Online at: https://wiki.pathmind.com/convolutional-network, Accessed from Internet on: Mar. 2, 2021, 13 pages.
"A Beginner's Guide to Deep Reinforcement Learning", Wikipedia, Available Online at: https://wiki.pathmind.com/deep-reinforcement-learning, Accessed from Internet on: Mar. 2, 2021, 13 pages.

(Continued)

*Primary Examiner* — Isaac M Woo
(74) *Attorney, Agent, or Firm* — Kilpatrick Townsend & Stockton LLP

(57) ABSTRACT

A data catalog system that is configured to automatically generate synthetic datasets based upon original datasets cataloged by the data catalog system, wherein each synthetic dataset comprises synthetic data that is generated using one or more data generation techniques. The data catalog system may access an original dataset and harvest associated metadata information and generate catalog information for the original dataset. The data catalog system may then generate a synthetic dataset based upon the original dataset and its harvested metadata information. The data catalog system may also generate catalog information for the generated synthetic dataset. The catalog information generated for the original dataset may be updated to refer to the newly generated synthetic dataset and its catalog information. The catalog information generated for the synthetic dataset may include references to the original dataset and its catalog information to inform a user of the original dataset about the synthetic dataset.

20 Claims, 15 Drawing Sheets

(56) References Cited

OTHER PUBLICATIONS

"A Beginner's Guide to Eigenvectors, Eigenvalues, PCA, Covariance and Entropy", Wikipedia, Available Online at: https://wiki.pathmind.com/eigenvector, Accessed from Internet on: Mar. 2, 2021, 16 pages.

"A Beginner's Guide to Graph Analytics and Deep Learning", Wikipedia, Available Online at: https://wiki.pathmind.com/graph-analysis, Accessed from Internet on: Mar. 2, 2021, 7 pages.

"A Beginner's Guide to LSTMs and Recurrent Neural Networks", Wikipedia, Available Online at: https://wiki.pathmind.com/lstm, Accessed from Internet on: Mar. 2, 2021, 15 pages.

"A Beginner's Guide to Markov Chain Monte Carlo, Machine Learning & Markov Blankets", Wikipedia, Available Online at: https://wiki.pathmind.com/markov-chain-monte-carlo, Accessed from Internet on: Mar. 2, 2021, 8 pages.

"A Beginner's Guide to Multilayer Perceptrons (MLP)", Wikipedia, Available Online at: https://wiki.pathmind.com/multilayer-perceptron, Accessed from Internet on: Mar. 2, 2021, 4 pages.

"A Beginner's Guide to Neural Networks and Deep Learning", Wikipedia, Available Online at: https://wiki.pathmind.com/neural-network, Accessed from Internet on: Mar. 1, 2021, 16 pages.

"A Beginner's Guide to Word2Vec and Neural Word Embeddings", Wikipedia, Available Online at: https://wiki.pathmind.com/word2vec, Accessed from Internet on: Mar. 2, 2021, 12 pages.

"Artificial Intelligence (AI) vs. Machine Learning vs. Deep Learning", Wikipedia, Available Online at: https://wiki.pathmind.com/ai-vs-machine-learning-vs-deep-learning, Accessed from Internet on: Mar. 2, 2021, 8 pages.

"Data Profiling Overview", Oracle Cloud Infrastructure, Accessed from Internet on: Feb. 10, 2021, 10 pages.

"Evaluation Metrics for Machine Learning—Accuracy, Precision, Recall, and F1 Defined", Wikipedia, Available Online at: https://wiki.pathmind.com/accuracy-precision-recall-f1, Accessed from Internet on: Mar. 2, 2021, 5 pages.

"NVIDIA Research Achieves AI Training Breakthrough Using Limited Datasets", Wikipedia, Available Online at: https://blogs.nvidia.com/blog/2020/12/07/neurips-research-limited-data-gan/, Accessed from Internet on: Mar. 2, 2021, 14 pages.

"OCI Data Catalog Product Management Home", Oracle Cloud Infrastructure, Feb. 7, 2020, 3 pages.

"Oracle Cloud Infrastructure Data Catalog", Available online at: https://www.oracle.com/in/big-data/data-catalog/, Accessed from Internet on: Feb. 10, 2021, 11 pages.

"Oracle Cloud Infrastructure Data Catalog", Available online at: https://www.oracle.com/a/ocom/docs/ebook-cloud-infrastructure-data-catalog.pdf, Accessed from Internet on: Feb. 10, 2021, 15 pages.

"Oracle Cloud Infrastructure Data Catalog", Available online at: https://www.oracle.com/a/ocom/docs/oci-data-catalog-data-sheet.pdf, Accessed from Internet on: Feb. 10, 2021, 5 pages.

Transcript and associated screen shots for YouTube Video"An Overview of Abhiram Gujjewar Oracle Cloud Infrastructure Data Catalog Overview", published on Sep. 18, 2020, Available online at: https://www.youtube.com/watch?v=ej0uQfHQHYU (total length of video: 44:37, 14 pages.

"Simulation, AI, Optimization and Complexity", Wikipedia, Available Online at: https://wiki.pathmind.com/simulation-optimization-ai, Accessed from Internet on: Mar. 2, 2021, 8 pages.

"Stanford Named Entity Recognizer (NER)", Available online at: https://nlp.stanford.edu/software/CRF-NER.shtml, Accessed from Internet on: Feb. 10, 2021, 5 pages.

"Symbolic Reasoning (Symbolic AI) and Machine Learning", Wikipedia, Available Online at: https://wiki.pathmind.com/symbolic-reasoning, Accessed from Internet on: Mar. 2, 2021, 14 pages.

Dandekar et al., "A Comparative Study of Synthetic Dataset Generation Techniques", International Conference on Database and Expert Systems Applications, 2018, pp. 387-395.

Isola et al., "Image-To-Image Translation With Conditional Adversarial Networks", Wikipedia, Available Online at: https://arxiv.org/abs/1611.07004, 2017, 17 pages.

Joshi, "Generative Adversarial Networks (GANs) for Synthetic Dataset Generation With Binary Classes", Available online at: https://datasciencecampus.ons.gov.uk/projects/generative-adversarial-networks-gans-for-synthetic-dataset-generation-with-binary-classes/#:~:text=GANs%20work%20by%20training%20a,to%20make%20it%20more%20realistic, Feb. 21, 2019, 36 pages.

Kubara, "GANs and Missing Data Imputation", Available online at: https://towardsdatascience.com/gans-and-missing-data-imputation-815a0cbc4ece, Aug. 6, 2019, 9 pages.

Ledig et al., "Photo-Realistic Single Image Super-Resolution Using a Generative Adversarial Network", Wikipedia, Available Online at: https://arxiv.org/pdf/1609.04802.pdf, 2017, 19 pages.

Lotter et al., "Unsupervised Learning of Visual Structure Using Predictive Generative Networks", Wikipedia, Available Online at: https://arxiv.org/pdf/1511.06380.pdf, 2016, 12 pages.

Manning et al., "The Stanford CoreNLP Natural Language Processing Toolkit", Proceedings of 52nd Annual Meeting of the Association for Computational Linguistics, Jan. 2014, pp. 55-60.

Nicholson, "A Beginner's Guide to Generative Adversarial Networks (GANs)", Available online at: https://wiki.pathmind.com/generative-adversarial-network-gan, Accessed from Internet on: Feb. 9, 2021, 27 pages.

Reed et al., "Generative Adversarial Text to Image Synthesis", Wikipedia, Available Online at: URL:http://proceedings.mlr.press/v48/reed16.html, Jun. 5, 2016, 10 pages.

Swalin, "How to Handle Missing Data", Available online at: https://towardsdatascience.com/how-to-handle-missing-data-8646b18db0d4, Jan. 31, 2018, 9 pages.

Yoon et al., "GAIN: Missing Data Imputation using Generative Adversarial Nets", Available online at: https://arxiv.org/pdf/1806.02920.pdf, Jun. 7, 2018, 10 pages.

\* cited by examiner

DATA CATALOG SYSTEM FOR GENERATING SYNTHETIC DATASETS

BACKGROUND

In today's competitive environment, enterprises are striving to be data-driven. They want better and faster access to their data, with faster analytics, and all this without sacrificing governance. It is critical for an enterprise to understand the kind of data the enterprise has at any point in time, where the data is stored, who is creating the data, how the data is being used, and whether the data is adequately protected. This is, however, a very difficult task, even for a small enterprise, given the large size of the data and the distributed nature of the data.

The data assets (referred to herein as datasets) of an enterprise may come in different forms and be stored in various storage locations. For example, the datasets may be in the form of files, tables, databases, autonomous databases, object stores, Big Data systems (e.g., Hive, Kafka), structured data, unstructured data, or data blobs, etc. The datasets may be stored in various different locations such as in data lakes, data warehouses, on-premise data stores, on devices in a distributed network (e.g., an enterprise network), in one or more clouds, and the like. The situation is even further aggravated by the continuously and dynamically changing landscape of the datasets, where datasets change form over time and get moved from one location to another (e.g., from on-premise, to cloud, to multiple cloud environments).

Enterprises use data catalog systems to create an organized inventory of their data assets or datasets. A data catalog system may provide various functionalities that enable this organized inventory to be generated and used by enterprise users. The data catalog for an enterprise provides a single, unified, all-encompassing and searchable view of the datasets of that enterprise. The functionalities of current data cataloging systems are however quite limited. Further, given data privacy concerns, the use of the data catalogs and the corresponding datasets is quite limited.

BRIEF SUMMARY

The present disclosure relates to data cataloging systems, and more particularly, to techniques used by a data catalog system for automatically generating synthetic datasets based upon original datasets cataloged by the data catalog system. Various embodiments are described herein, including methods, systems, non-transitory computer-readable storage media storing programs, code, or instructions executable by one or more processors, and the like.

In certain embodiments, a data catalog system may access an original dataset and harvest associated metadata information and generate catalog information for the original dataset. The data catalog system may then generate a synthetic dataset based upon the original dataset and its harvested metadata information. The data catalog system may also generate catalog information for the generated synthetic dataset. The catalog information generated for the original dataset may be updated to refer to the newly generated synthetic dataset and its catalog information. The catalog information generated for the synthetic dataset may include references to the original dataset and its catalog information to inform a user of the original dataset about the synthetic dataset.

The synthetic datasets that are generated can be used for various different purposes such as for training machine-learning models. For example, the synthetic datasets can be used as training data for training a machine-learning model for a particular purpose. The synthetic dataset provide complete training sets that improve the accuracy of the models that are trained using the synthetic datasets. A data catalog system provides a centralized point for accessing and cataloging various different original datasets.

Different types of synthetic datasets may be generated by a data catalog system based upon an original dataset. As one example, the data catalog system may determine that the original dataset has portions of data that are missing (e.g., there may identify holes or gaps in the original dataset) and may generate a synthetic dataset in which the missing data is filled in with automatically generated synthetic data. As another example, the data catalog system may determine that the original dataset contains restricted data (e.g., personal identifiable information (PII), data that is restricted by laws or regulations, data that is tagged by the enterprise as being restricted, etc.) and may generate a synthetic dataset based upon the original dataset where the restricted data in the original dataset is replaced with synthetically generated data. As yet another example, the data catalog system may generate synthetic data to augment an original dataset that is cataloged. For example, the data catalog system may generate a synthetic dataset that contains data from the original dataset and additionally contains new synthetic data. As yet another example, the data catalog system may generate a new synthetic dataset that entirely contains new synthetic data generated based on an original dataset and which retains certain attributes/characteristics from the original enterprise dataset.

A data catalog system may use various different data generation techniques to generate synthetic data that is used to build a synthetic dataset. In certain implementations, the data catalog system may use one or more machine algorithms to generate the synthetic data. The machine-learning techniques may be implemented using an adaptive machine-learning system that employs different flexible machine-learning models to generate the synthetic datasets.

In certain embodiments, the cataloging of original datasets and the generation of synthetic datasets and their associated synthetic catalog information may be offered as cloud services by a cloud services provider. The services are made available to a customer or subscriber who subscribes to these services provided by the cloud services provider.

In certain embodiments, techniques are disclosed wherein a data catalog system performs processing comprising generating, by a data catalog system and based upon an original dataset and metadata information for the original dataset, catalog information for the original dataset, the catalog information for the original dataset comprising information related to the original dataset and information usable for accessing the original dataset; generating, by the data catalog system, a synthetic dataset based upon the original dataset and the metadata information for the original dataset; generating, by the data catalog system, catalog information for the synthetic dataset, the catalog information for the synthetic dataset comprising information related to the synthetic dataset, information referencing the original dataset and information usable for accessing the synthetic dataset; and updating, by the data catalog system, the catalog information for the original dataset to include information referencing the synthetic dataset.

In certain embodiments, the information referencing the original dataset includes information usable for accessing the original dataset. In certain embodiments, the information referencing the synthetic dataset includes information usable for accessing the synthetic dataset.

In certain embodiments, generating the synthetic dataset further comprises generating, by the data catalog system and based upon the original dataset, synthetic data and using one or more data generation techniques; and including the synthetic data in the synthetic dataset. In certain further embodiments, the one or more data generation techniques include a machine learning technique.

In certain embodiments, generating the synthetic dataset further comprises determining, by the data catalog system, that the original dataset comprises missing data; generating, by the data catalog system and using one or more data generation techniques, synthetic data to fill in the missing data; and generating, by the data catalog system, the synthetic data set by including data from the original dataset in the synthetic dataset and filling in the missing data with the synthetic data in the synthetic dataset.

In certain embodiments, generating the synthetic dataset further comprises determining, by the data catalog system, that the original dataset comprises restricted data; generating, by the data catalog system and using one or more data generation techniques, synthetic data to replace the restricted data; and generating, by the data catalog system, the synthetic data set by including data from the original dataset in the synthetic dataset and substituting the restricted data with the synthetic data in the synthetic dataset. In certain embodiments, the restricted data comprises at least one of personal identifiable information, data tagged as being restricted, or data that is restricted due to a rule.

In certain embodiments, generating the synthetic dataset further comprises generating, by the data catalog system and using one or more data generation techniques, synthetic data based upon the original dataset; and generating, by the data catalog system, the synthetic data set by including in the synthetic dataset the original dataset and the synthetic data.

In certain embodiments, generating the synthetic dataset further comprises generating, by the data catalog system and using one or more data generation techniques, synthetic data based upon the original dataset, wherein the synthetic data is the synthetic dataset.

In certain embodiments, generating the synthetic dataset further comprises generating, by the data catalog system and using one or more data generation techniques, synthetic data based upon the original dataset, wherein the synthetic data is the synthetic dataset.

In certain embodiments, the data catalog system performs processing further comprising further comprising using the synthetic dataset to train a machine-learning model. In certain embodiments, the data catalog system contains both structured and unstructured data.

In certain embodiments, a system, such as a data catalog system, comprises a processor and memory including instructions that, when executed by the processor, cause the device to perform the processing described herein. In another example embodiment, a non-transitory computer-readable medium stores a plurality of instructions executable by one or more processors to cause the one or more processors to perform the processing described herein.

The foregoing, together with other features and aspects will become more apparent upon referring to the following specification, claims, and accompanying drawings.

DETAILED DESCRIPTION

Figure 1:
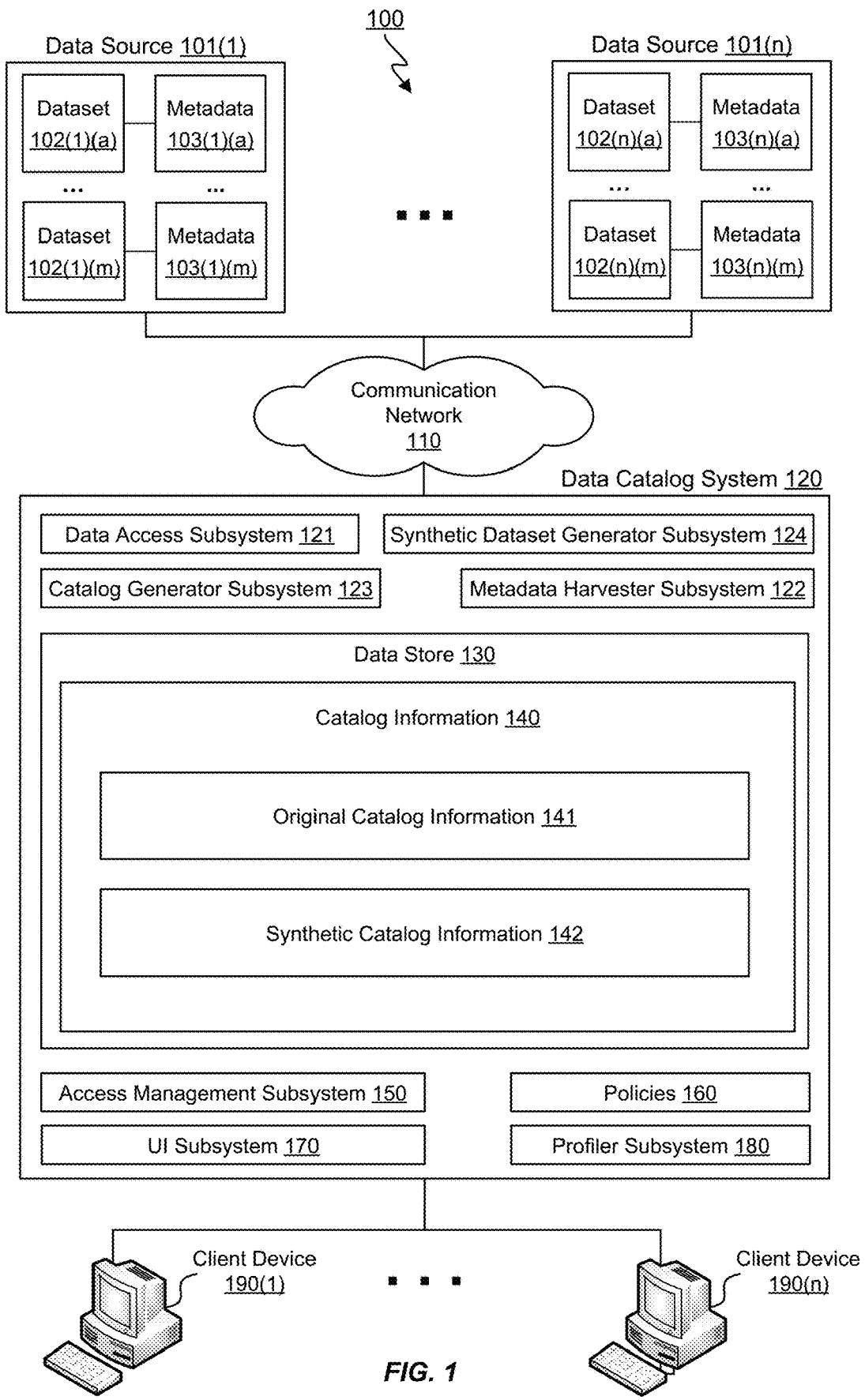
FIG. 1 is a simplified diagram of a distributed environment incorporating a data catalog system, according to various embodiments.

In the following description, for the purposes of explanation, specific details are set forth in order to provide a thorough understanding of certain aspects. However, it will be apparent that various aspects may be practiced without these specific details. The figures and description are not intended to be restrictive. The word "exemplary" is used herein to mean "serving as an example, instance, or illustration." Any aspect or design described herein as "exemplary" is not necessarily to be construed as preferred or advantageous over other aspects or designs.

The present disclosure relates to data cataloging systems, and more particularly, to techniques used by a data catalog system for automatically generating synthetic datasets based upon original datasets cataloged by the data catalog system. Various embodiments are described herein, including methods, systems, non-transitory computer-readable storage media storing programs, code, or instructions executable by one or more processors, and the like.

In certain embodiments, a data catalog system may access an original dataset and harvest associated metadata information and generate catalog information for the original dataset. The data catalog system may then generate a synthetic dataset based upon the original dataset and its harvested metadata information. The data catalog system may also generate catalog information for the generated synthetic dataset. The catalog information generated for the original dataset may be updated to refer to the newly generated synthetic dataset and its catalog information. The catalog information generated for the synthetic dataset may include references to the original dataset and its catalog information to inform a user of the original dataset about the synthetic dataset.

Different types of synthetic datasets may be generated by a data catalog system based upon an original dataset. As one example, the data catalog system may determine that the original dataset has portions of data that are missing (e.g., there may identify holes or gaps in the original dataset) and may generate a synthetic dataset in which the missing data is filled in with automatically generated synthetic data. As another example, the data catalog system may determine that the original dataset contains restricted data (e.g., personal identifiable information (PII), data that is restricted by laws or regulations, data that is tagged by the enterprise as being restricted, etc.) and may generate a synthetic dataset based upon the original dataset where the restricted data in the original dataset is replaced with synthetically generated data. As yet another example, the data catalog system may generate synthetic data to augment an original dataset that is cataloged. For example, the data catalog system may generate a synthetic dataset that contains data from the original dataset and additionally contains new synthetic data. As yet another example, the data catalog system may generate a new synthetic dataset that entirely contains new synthetic data generated based an original dataset and which retains certain attributes/characteristics from the original enterprise dataset.

A data catalog system may use various different data generation techniques to generate synthetic data that is used to build a synthetic dataset. In certain implementations, the data catalog system may use one or more machine algorithms to generate the synthetic data. The machine-learning techniques may be implemented using an adaptive machine-learning system that employs different flexible machine-learning models to generate the synthetic datasets.

In certain embodiments, the cataloging of original datasets and the generation of synthetic datasets and their associated synthetic catalog information may be offered as cloud services by a cloud services provider. The services are made available to a customer or subscriber who subscribes to these services provided by the cloud services provider.

A data catalog system, due to its data cataloging functionality, provides a centralized entity that has access to multiple different types of original datasets. It thus is uniquely located to automatically generate various different synthetic datasets and associated synthetic catalog information. The data catalog system may then make the generated synthetic datasets available for various downstream uses and applications. In one use case, the synthetic datasets may be used by data scientists for training and building machine-learning (ML) models. In contrast to rules-based analytics systems of the past, the current trend is to use machine-learning techniques to perform various analytics, such as to gain insights, discover trends, make predictions about performance, regression analysis, solving categorization problems, and others. Many of these machine-learning (ML) techniques require historical data that is used to train ML models, which are then used for making analysis predictions.

The accuracy, and thus the usability, of these models depends upon the quality of the training data. It is preferred that the training dataset is as complete as possible—training with a dataset that has holes leads to inaccurate models, which lead to bad outcomes. Even if a dataset is complete, many times the dataset contains restricted data that has to be removed from the dataset before the dataset can be made available for training. However, removing this restricted data again creates holes in the dataset leading to inaccurate models, as described above. In some instances, the entire dataset is marked as restricted leading to the entire dataset being unavailable for training. Given the nature of enterprise datasets, a large number of the datasets are not appropriate for ML training because of the problems described above. As a result, even though historical data is available for training purposes, it cannot be use. The synthetic datasets generated by data catalog system described in this disclosure provides a solution to these problems. These synthetic datasets are generated using automated techniques substantially free of any manual intervention. The synthetic dataset are thus generated in an efficient and fast manner.

As described in this disclosure, gaps in the original datasets are automatically filled in with synthetically generated data. In a similar manner, for restricted data, the restricted data is replaced with synthetically generated data that is similar to the restricted data but is fake. Entire datasets may be synthesized by the data catalog system. Original datasets may also be augmented with synthetic data generated by the data catalog system. The synthetic datasets generated by the data catalog system thus provide ideal candidates for training ML models. By generating multiple synthetic datasets automatically, the data catalog system enables a vast amount of diverse training data to be made available for use by data scientists. The diversity of the synthetic dataset that is generated enables it to be used for training models for various different applications. Further, the inclusion of the synthetic data in the synthetic datasets make the synthetic datasets better training data candidates than their corresponding original datasets, thus improving the accuracy and performance of the models trained using the synthetic datasets.

Example Systems and Embodiments

FIG. 1 is a simplified diagram of a distributed environment 100 incorporating a data catalog system 120 according to certain embodiments. As shown in FIG. 1, distributed environment 100 comprise multiple data sources 101(1) . . . 101(n) communicatively coupled to a data catalog system 120 via a communication network 110. Client devices 190(1) . . . 190(n) may also be coupled to data catalog system 120 via one or more communication networks. Distributed environment 100 depicted in FIG. 1 is merely an example and is not intended to unduly limit the scope of claimed embodiments. Many variations, alternatives, and modifications are possible. For example, in some implementations, distributed environment 100 may have more or fewer systems than those shown in FIG. 1, may combine two or more systems, or may have a different configuration or arrangement of systems.

Communication network 110 can be of various types and can include one or more communication networks.

Examples of communication network 110 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols. In general, communication network 110 may include any infrastructure that facilitates communications between the various systems depicted in FIG. 1.

As previously described, the datasets of an enterprise can come in different forms and may be stored in various different locations. For example, in the embodiment depicted in FIG. 1, datasets $102(1)(a)$ to $102(1)(m)$ are stored on data source 101(1), datasets $102(n)(a)$ to $102(n)(m)$ are stored on data source $101(n)$, and the like. Each dataset may be associated with metadata that provides information about the dataset. For example, as depicted in FIG. 1, metadata $103(1)(a)$ is associated with dataset $102(1)(a)$, metadata $103(1)(m)$ is associated with dataset $102(1)(m)$, metadata $103(n)(m)$ is associated with dataset $102(n)(m)$, and the like. The data sources depicted in FIG. 1 could be data lakes, data warehouses, on-premise data stores, devices in a distributed network (e.g., an enterprise network), locations in one or more clouds, and the like. The datasets may be in different forms, such as files, tables, databases, autonomous databases, object stores, Big Data systems (e.g., Hive, Kafka), structured data, unstructured data, or data blobs, etc.

The metadata associated with a dataset may include different types of information about the dataset. For example, the metadata for a dataset may include: (a) technical metadata describing technical information about the dataset, such as information about schemas, tables, columns, file names, report names, or information about data sources system, etc.; (b) business metadata that captures business context and business knowledge information for a dataset that users have about the dataset and may include information about business descriptions, comments, annotations, classifications, fitness-for-use, ratings, business glossaries, and more; and (c) operational metadata identifying data usage patterns for the dataset, such as, when was a data object refreshed, which ETL (extract-transform-load) job created the dataset, how many times has a table been accessed by users and by which ones, and the like. The metadata for a dataset may also include other types of metadata information. The amount of metadata available for datasets may vary from one dataset to another. In certain embodiments, as described below, data catalog system 120 may introspect datasets to determine metadata for the datasets.

Data catalog system 120 depicted in FIG. 1 provides a solution to enterprises' data management needs and helps enterprises manage their data by creating an organized inventory of their data assets or datasets. Data catalog system 120 provides various functionalities that enable this organized inventory to be generated and used by enterprise users. For example, data catalog system 120 provides a discovery mechanism for discovering datasets for an enterprise. Data catalog system 120 provides harvesting capabilities for harvesting metadata associated with the original datasets. Data catalog system 120 then uses the results obtained from the discovery and harvesting processes to build or generate catalog information (referred to as a data catalog) for the enterprise. The data catalog for an enterprise provides a single, unified, all-encompassing and searchable view of the datasets of that enterprise.

In certain implementations, data catalog system 120 may be provided by a cloud service provider and the functionalities provided by data catalog system 120 are offered as cloud services to subscribing customers, which may be enterprises. Customers subscribing to the data catalog-related services provided by the cloud service provider can then avail themselves of the functionalities provided by data catalog system 120. The data cataloging service provides an organized inventory of enterprise data assets that may be stored in various environments including on-premise, cloud, and other environments.

A data catalog generated by data catalog system 120 for an enterprise can be used for different purposes. Since the data catalog for an enterprise provides a holistic view of an enterprise's datasets, it enables users to get deeper visibility and understanding into these datasets. The data catalog can be used to find and trace datasets including metadata related to the datasets such as business context information, operational metrics information, organizational information about how the dataset fits in with other datasets of the enterprise, and other like info.

A data catalog generated by data catalog system 120 for a set of original datasets may include information that reflects the metadata associated with the original datasets. As described above, the metadata may include various different types of metadata such technical metadata, business metadata, operational metadata, and other types of metadata. By including information reflecting the metadata of the original datasets in the data catalog, the metadata information is made searchable. For example, users may use the data catalog to search for original datasets meeting a certain criterion (or criteria) (e.g., to find tables containing a particular column attribute, to find datasets where the usage of the datasets is above some threshold, to find datasets having a certain threshold number of records, etc.). The data catalog may then further be used to access the datasets returned as search results in response to search queries specific by the user.

A data catalog generated by data catalog system 120 for an enterprise can be used by various different types of users. These users may include data engineers, data scientists, data analysts, data stewards, enterprise architects, management and marketing personnel, and the like, who are interested in finding, exploring, tracing, and analyzing the enterprise data. For example, a data catalog generated by data catalog system 120 may be used by users to easily find and access fit-for-use data for various purposes such as for data access, data analytics, data science, and data engineering.

In some instances, data catalog system 120 may generate a single data catalog for a customer, wherein the single data catalog stores information for all the customer's datasets that are cataloged by data catalog system 120. In some other instances, data catalog system 120 may generate multiple data catalogs for a customer, each data catalog containing information comprising information for a subset of the customer's original datasets.

In addition to the data cataloging functionalities described above, as described herein, in certain embodiments, data catalog system 120 is also configured to generate new datasets based upon the enterprise datasets that are cataloged. To clearly differentiate the enterprise datasets that are cataloged by data catalog system 120 from the new datasets that are generated by data catalog system 120 based upon the enterprise datasets, the enterprise datasets are referred to herein as "original datasets" and the datasets generated by data catalog system 120 are referred to herein as "synthetic datasets" since at least a portion of each generated dataset includes data that has been synthesized or generated using one or more data generation techniques.

There are various ways in which synthetic datasets may be generated by data catalog system 120. As one example, for a particular original enterprise dataset, data catalog system 120 may determine that the particular original dataset has portions of data that are missing (e.g., it may identify holes or gaps in the original dataset). For example, if the dataset is in the form of a table comprising rows and columns, upon introspecting the original dataset and/or based upon the metadata associated with the original dataset, data catalog system 120 may determine that data in certain cells of the table is missing (e.g., data in certain cells of a particular column of a table is missing). Data catalog system 120 may then use one or more synthetic data generation techniques to generate the missing data. In certain implementations, the missing data may be imputed based upon the original dataset and its associated metadata. Data catalog system 120 may then make a copy of the original enterprise dataset (the one with the missing data) and then, in the copy, fill in the missing gaps with the synthetically generated data. The newly generated synthetic dataset thus includes the data from the original enterprise dataset along with the synthetically generated data for the missing data. The new dataset with the missing data filled in represents a new synthetic dataset that is generated from the original enterprise dataset.

As another example, for a particular original enterprise dataset cataloged by data catalog system 120, data catalog system 120 may determine that portions of data in the particular dataset is restricted data. For example, the restricted data may correspond to personal identifiable information (PII) (e.g., social security numbers, passwords, etc.), data that is restricted by laws or regulations (e.g., data that is restricted under General Data Protection Regulation (GDPR), which is the latest data privacy and security law instituted in Europe), data that is tagged by the enterprise as being restricted (e.g., marked as confidential data, private data, etc.), and the like. In such scenarios, data catalog system 120 may use one or more synthetic data generation techniques to generate synthetic data corresponding to the restricted data. Data catalog system 120 may then make a copy of the original enterprise dataset and then, in the copy, substitute or replace the restricted data with the synthetically generated fake data. The new dataset containing data from the original dataset but with the restricted data being replaced/substituted by the synthetically generated data represents a newly generated synthetic dataset that is generated from the original enterprise dataset.

As yet another example, data catalog system 120 may generate a new synthetic dataset that includes the original dataset along with new synthetic data that is generated by data catalog system 120 based upon the original dataset, and where a synthetic dataset is generated by including the original dataset that is cataloged and augmenting it with the synthetic data. For example, if the original dataset is in the form of a table comprising rows and columns, upon introspecting the original dataset and/or based upon the metadata associated with the original dataset, data catalog system 120 may generate synthetic for a new column (or new row) to be added to the original dataset. Data catalog system 120 may then use one or more synthetic data generation techniques to generate the data for the cells of the new column (or new row). Data catalog system 120 may then make a copy of the original enterprise dataset and augment it with the new synthetic data. The new synthetic dataset thus includes the original dataset along with the newly generated synthetic data.

As yet another example, for a particular original enterprise dataset cataloged by data catalog system 120, data catalog system 120 may use one or more synthetic data generation techniques to generate a completely new synthetic dataset that retains certain attributes/characteristics from the original enterprise dataset but contains new synthetic data. For example, if the original enterprise dataset is a table of rows and columns, the newly generated synthetic dataset may have the same number of columns and features represented by the columns, but the data values stored in the cells of the table are synthetically generated and different from the corresponding data values in the cells of the original dataset. This newly generated dataset represents a new synthetic dataset that is generated from the original enterprise dataset.

While specific examples of synthetic datasets are described above and in other parts of this disclosure, these are not intended to be limiting. Various combinations of the new data generation techniques may be used to generate various types of synthetic datasets. For example, a new synthetic dataset may be generated by filling in missing data in the original dataset and also by replacing the restricted data in the original dataset with fake synthetically generated data. A synthetic dataset may be generated based upon a single original enterprise dataset or based upon multiple original datasets. One or multiple different synthetic datasets may be generated by data catalog system 120 for a single original dataset.

For each synthetic dataset, at least a portion of the data in the dataset is synthetically generated by data catalog system 120. Data catalog system 120 may use various different data generation techniques to generate the synthetic data that is used to build the synthetic datasets. These techniques may include one or more machine-learning (ML) techniques, rules-based techniques, and others. In certain implementations, one or more machine-learning-based techniques may be used. For example, Generative Adversarial Networks (GANs) may be used to generate the synthetic data in the synthetic datasets, where the generated synthetic data closely resembles the original or real data. An example of a GAN architecture has been described in "Ian J. Goodfellow et al., *Generative Adversarial Nets*, NIPS'14: Proceedings of the 27th International Conference on Neural Information Processing Systems, Volume 2, December 2014, pp. 2672-2680." The entire contents of the Goodfellow et al. publication are incorporated herein by reference for all purposes.

A GAN is capable of generating synthetic data based upon real data that is provided as input to the GAN. The synthetic data generated by a GAN mimics the real data in terms of essential parameters, univariate and multivariate distribution, cross-relations between the variables, and so on. During training, a GAN learns the true data distribution of the input training dataset with a view to generating new data points from this distribution with some variations and not just reproducing the old data the model has been trained on. In certain use cases, the synthetic data generated by a GAN can be used to augment the real data to produce synthetic datasets.

A typical GAN architecture consists of two adversarial models generally implemented as neural networks that compete with each other. These adversarial models include a generator neural network (generator) and a discriminator neural network (discriminator). The generator is trained to generate new synthetic data based upon real data provided as input to the generator. The discriminator is a type of classifier that is trained to differentiate between real data or synthetic data by estimating a probability that a sample generated by the generator is real data or generated data. During the training of a GAN, the generator and discriminator play a continuous adversarial game, as a result of which, as the training progresses, the generator learns to produce more realistic data samples based upon the input training data, and the discriminator learns to get better at distinguishing the generated synthetic data from the real data. This adversarial cooperation between the two networks is responsible for the success of the GAN, where they both learn at the expense of one another and attain an equilibrium over time.

A trained GAN can then be used to generate synthetic data for data provided as input to the GAN. A GAN, for example, may be used to generate the various synthetic datasets described in the disclosure. There are different GAN architectures for generating different types of synthetic data, including architectures for generating synthetic tabular data.

Other machine-learning-based techniques, other than GANs, may also be used to generate the synthetic datasets described in this disclosure. These techniques may include the use of neural networks (e.g., convolutional neural networks (CNNs)), Variational Autoencoders (VAEs), decision trees, random forest techniques, linear regression, other deep learning techniques, and others.

Additionally, non-machine-learning based techniques may also be used in addition to or instead of machine-learning-based techniques to generate synthetic datasets. These include, for example, various sampling and best-fit techniques, Monte Carlo techniques, and others.

The synthetic datasets may be used for various purposes. For example, the synthetic datasets may be used by data scientists for training and building machine-learning (ML) models. The synthetic datasets generated by the data catalog system provide ideal candidates for training ML models. By generating multiple synthetic datasets automatically, the data catalog system enables a vast amount of diverse training data to be made available for use by data scientists. The diversity of the synthetic dataset that is generated enables it to be used for training models for various different applications. Further, the inclusion of the synthetic data in the synthetic datasets makes the synthetic datasets better training data candidates than their corresponding original datasets, thus improving the accuracy and performance of the models trained using the synthetic datasets.

A synthetic dataset may be used for experimental purposes by both internal and/or external entities. In an example of internal entity use, a member of an organization, such as a data scientist employed by the organization, may generate synthetic datasets from an original training dataset owned by the organization to test a trained machine learning model. The generated synthetic datasets may comprise at least one new synthetic data portion or attribute not present in the original training dataset. For example, the synthetic dataset may be input to a trained machine learning model to test the accuracy of a corresponding prediction output by the trained machine learning model when the model processes the new synthetic data attribute. Synthetic datasets may also be used by entities outside an organization. For example, a customer of an organization may request a training dataset for training a customer-owned machine learning model. It may be determined that the training dataset sought by the customer contains potentially sensitive information. One or more synthetic datasets may instead be responsively generated from the sought training data and sent to the customer in lieu of the training dataset.

In addition to generating synthetic datasets, data catalog system 120 is configured to generate a data catalog for the synthetic datasets. For purposes of clarity, a data catalog generated by data catalog system 120 for a customer for the customer's original datasets is referred to as the original data catalog or original catalog information, and a data catalog generated by data catalog system 120 for synthetic datasets that have been generated based upon the customer's original datasets is referred to as a synthetic data catalog or synthetic catalog information. The synthetic data catalog enables users to quickly find and access the synthetic datasets generated by data catalog system 120.

In some instances, data catalog system 120 may generate a single synthetic data catalog for a customer, wherein the single synthetic data catalog stores information for all the synthetic datasets that have been generated by data catalog system 120 based upon the customer's original datasets that are cataloged by data catalog system 120. In some other instances, data catalog system 120 may generate multiple synthetic data catalogs for a customer, each synthetic data catalog containing information related to a subset of the synthetic datasets generated based upon the customer's original datasets.

In certain embodiments, a synthetic data catalog is generated by data catalog system 120 in a manner that is similar to generating a original data catalog. A synthetic data catalog generated for a set of synthetic datasets may contain, for each synthetic dataset, information about the data stored by the synthetic dataset. A synthetic data catalog may include information that reflects metadata associated with the synthetic datasets. As described above, the metadata may include various different types of metadata such as technical metadata, business metadata, operational metadata, and other types of metadata. By including information reflecting the metadata of the synthetic datasets in the synthetic data catalog, the synthetic data catalog is made searchable to enable users to find synthetic datasets that meet user specified search criteria. For example, users may query the synthetic data catalog with certain criterion (or criteria) and information identifying the synthetic dataset that meet the criterion (criteria) may be output to the user. The user can then decide to access one or more of the synthetic datasets returned in the search results.

The synthetic data catalog may identify which portions of the dataset include synthetically generated data, and provide a profile (e.g., usage statistics) of the synthetic dataset. This synthetic data catalog enables users to easily find the synthetic datasets and also to find out information related to the synthetic datasets.

In certain implementations, the information stored in a synthetic data catalog for a synthetic dataset may include information indicative of the original enterprise dataset (or datasets) that was used to generate that synthetic dataset. This way, the synthetic data catalog may include lineage information tracing a line from a synthetic dataset to the original dataset that was used to generate that new dataset. For a synthetic dataset, the synthetic data catalog may also include information that can be used to not only access the synthetic dataset but also the original dataset that was used to generate the synthetic dataset. For example, for a synthetic dataset, a reference or link to the original enterprise dataset used to generate that synthetic dataset may be stored in the synthetic data catalog that contains information for the synthetic dataset. This reference or link enables a user to easily identify the original dataset that was used to generate the new dataset and may enable the user to access that original dataset.

In certain implementations, the catalog information stored in the synthetic data catalog for a synthetic dataset may identify which portions of the synthetic dataset are copied from the original dataset and which portions are synthetically generated. This information may be useful to users of the synthetic datasets. Additionally, synthetic data can be generated for any original data sets that an organization does not intend to release or share with other entities. For example, an organization may generate an original dataset containing proprietary information relating to the activities of the organization. The dataset may be valuable for various uses, such as for training external models, but release of the original dataset would compromise the proprietary information and thus the organization may not want this dataset private. In lieu of the original dataset, a synthetic dataset may be generated which comprises a similar data structure and data attributes as the original dataset but which replaces the original proprietary data values with non-proprietary synthetic data. The resulting synthetic dataset mimics the original dataset but does not compromise the proprietary information of the original dataset. This synthetic dataset can then be made available for a variety of uses such as for training ML models.

Data catalog system 120 also updates the original data catalog generated for the original datasets to include information related to the synthetic datasets that have been generated based upon one or more of the original datasets. For example, for a particular original dataset that was used by data catalog system 120 to generate a synthetic dataset, the catalog information in the original data catalog may be updated by data catalog system 120 to identify the synthetic dataset. This enables users accessing the original data catalog to, for an original dataset, have knowledge of any synthetic datasets that have been generated based upon that original dataset.

Data catalog system 120 generates various data assets in the form of original data catalogs, synthetic datasets, and synthetic data catalogs. Data catalog system 120 provides various mechanisms that enable a user to access these generated data assets. As shown in FIG. 1, users may access information generated by data catalog system 120, including various catalogs and synthetic datasets, via one or more client devices 190(1) . . . 190(n). In certain implementations, data catalog system 120 may provide user interfaces (e.g., provided by user interface subsystem 170 of data catalog system 120) that enable users to interact with data catalog system 120 (e.g., provide inputs to data catalog system 120 and receive outputs provided by data catalog system 120). These interfaces may be in the form of graphical user interfaces (GUIs), which may be displayed by client devices 190 used by the users, application programmer interfaces (APIs) such as REST APIs that are callable by users, command line options, and the like.

Data catalog system 120 is configured to control or regulate access to the catalogs and synthetic datasets generated by data catalog system 120. The access to these resources may be based upon policies configured for data catalog system 120. For example, in the embodiment depicted in FIG. 1, data catalog system 120 includes an access management subsystem 150 that is configured to control access to the catalogs and synthetic datasets generated by data catalog system 120 based upon one or more policies 160. Policies 160 may specify rules that specify which datasets and catalogs can be accessed by which users and under what conditions. In certain embodiments, policies 160 may be configured by an administrator of data catalog system 120. Data catalog system 120 thus provides a layer of governance that controls access to the catalogs and to the synthetic datasets.

The original data catalog(s) generated by data catalog system 120 for a customer provide a comprehensive view of original datasets of the customer. The synthetic data catalog(s) generated for a customer provide a view of the synthetic datasets that are generated based upon the customer's original datasets. In some embodiments, customers can provide or use their own proprietary algorithms for synthetic data generation. For example, a customer may specify a number of rules or patterns for synthetic data generation, such as a rule that all calendar date information is presented in a "Year-Month-Date" format or all proper nouns are capitalized, etc. The data catalogs can be used to easily find and access the original and/or the synthetic datasets. Further, by providing access control mechanisms, data catalog system 120 also provides data governance capabilities governing who can access the catalogs and the datasets. Data catalog system 120 may provide cataloging and synthetic datasets generation services for one or more customers.

Data catalog system 120 may be implemented using multiple subsystems, which work together to provide the various functionalities provided by data catalog system 120. The subsystems and other components of data catalog system 120 depicted in FIG. 1 may be implemented in software (e.g., code, instructions, program) executed by one or more processing units (e.g., processors, cores), using hardware, or combinations thereof. The software may be stored on a non-transitory storage medium (e.g., on a memory device or disk). In the embodiment depicted in FIG. 1, the subsystems include a data access subsystem 121, a metadata harvester subsystem 122, a catalog generator subsystem 123, a synthetic dataset generator subsystem 124, an access management subsystem 150, a UI subsystem 170, and a profiler subsystem 180. Data catalog system 120 depicted in FIG. 1 is merely an example and is not intended to unduly limit the scope of claimed embodiments. Many variations, alternatives, and modifications are possible. For example, in some implementations, data catalog system 120 may have more or fewer components than those shown in FIG. 1, may combine two or more components, or may have a different configuration or arrangement of components.

Data used, stored, or generated by data catalog system 120 may be stored in a data store 130, which may be implemented as a non-volatile memory store. Data source 101(1) may be a single data source, or in other implementations, may be distributed in nature with data source 101(n) representing a collection of different data sources that may be communicatively coupled to data catalog system 120.

In certain implementations, data access subsystem 121 is configured to search for and access the original enterprise datasets to be cataloged. In certain scenarios, a customer subscribing to cloud services offered by data catalog system 120 may identify specific datasets to be cataloged, and data access subsystem 121 is configured to locate and access the specified datasets from their data sources. In some other scenarios, a customer may identify one or more data sources, and data access subsystem 121 may then crawl these data sources and discover the datasets stored by those data sources that are to be cataloged. Data access subsystem 121 may provide information related to the original datasets to be cataloged to metadata harvester subsystem 122, catalog generator subsystem 123, and synthetic dataset generator subsystem 124.

Metadata harvester subsystem 122 may be configured to locate and harvest metadata corresponding to the original datasets to be cataloged and also synthetic datasets generated by data catalog system 120. For example, if original dataset 102(1)(a) in FIG. 1 is to be cataloged, metadata harvester subsystem 122 accesses and processes metadata 103(1)(a) corresponding to dataset 102(1)(a). In certain instances, data harvester subsystem 122 may also determine the metadata for original dataset 102(1) by introspecting that dataset. Metadata harvester subsystem 122 is also configured to harvest metadata for synthetic datasets generated by data catalog system 120. Metadata harvester subsystem 122 may provide the harvested metadata for an original dataset to catalog generator subsystem 123 to enable it to generate/update the original data catalog storing information for the original dataset and to synthetic dataset generator subsystem 124 to enable it to generate synthetic datasets. Metadata harvester subsystem 122 may provide the harvested metadata for a synthetic dataset to catalog generator subsystem 123 to enable it to generate/update the synthetic data catalog storing information for the synthetic dataset.

Synthetic dataset generator subsystem 124 is configured to generate synthetic datasets for one or more customers based upon the original datasets of the customers. The synthetic datasets generated by data catalog system 120 may be stored in data store 130. Synthetic dataset generator 124 may use various different techniques to generate synthetic datasets. For example, as described above, a new synthetic dataset may be generated by making a copy of an original dataset and filling in data missing in the original dataset with synthetically generated data. A new synthetic dataset may be generated by making a copy of an original dataset and substituting/replacing restricted data in the original dataset with synthetically generated data. As another example, a new synthetic dataset may be generated by generating synthetic data based upon the original dataset.

Various different techniques may be used by synthetic dataset generator subsystem 124 for generating the synthetic data in the synthetic datasets. These techniques may include one or more machine-learning (ML) techniques. For example, generative adversarial networks (GANs), Variational Auto Encoders (VAEs), and/or any other ML-based structures may be used to implement the techniques described herein. Synthetic dataset generator subsystem 124 may provide information regarding newly generated synthetic datasets to metadata harvester subsystem 122 to enable it to harvest metadata for the synthetic dataset and to catalog generator subsystem 123 to enable it to generate/update information stored in the synthetic data catalog for the generated synthetic datasets.

Catalog generator subsystem 123 is configured to generate and/or update original catalogs for one or more customers. An original data catalog generated by catalog generator subsystem 123 for a customer may store information related to the original datasets for the customer that are accessed by data access subsystem 121. The original data catalog may also include information regarding metadata corresponding to the original datasets that is received from metadata harvester subsystem 122. The original data catalogs generated by catalog generator subsystem 123 for one or more customers may be stored in data store 130. After an original data catalog has been generated for a customer, as additional datasets are cataloged for that customer, the original data catalog is updated by catalog generator subsystem 123 for those additional original datasets.

Catalog generator subsystem 123 is also configured to generate and/or update synthetic data catalogs for customers for synthetic datasets generated by data catalog system 120. A synthetic data catalog generated by catalog generator subsystem 123 for a customer may store information related to the synthetic datasets generated for the customer. Information regarding these synthetic datasets may be received by catalog generator subsystem 123 from synthetic dataset generator subsystem 124. The synthetic data catalog may also include information regarding metadata corresponding to the synthetic datasets that is received from metadata harvester subsystem 122. The synthetic data catalogs generated by catalog generator subsystem 123 for one or more customers may be stored in data store 130. After a synthetic data catalog has been generated for a customer, as additional synthetic datasets are generated by data catalog system 120 based upon the customer's original datasets, the synthetic data catalog for that customer is updated by catalog generator subsystem 123 for the newly generated synthetic datasets.

A synthetic data catalog also includes information related to the original dataset that was the basis for generation of the synthetic dataset. This information enables a user to easily identify the original dataset that was used to generate the synthetic dataset and also enables the user to access that original dataset, if so desired by the user. The synthetic data catalogs generated by catalog generator subsystem 123 for one or more customers may be stored in data store 130. After a synthetic data catalog has been generated for a customer, as additional synthetic datasets are generated by data catalog system 120 for that customer, the synthetic data catalog is updated for those additional synthetic datasets.

When a synthetic dataset is generated for an original dataset, the catalog generator subsystem 123 is also responsible for updating the catalog information for that original dataset in the original data catalog to include information about the synthetic dataset. This enables users accessing the original data catalog to, for an original dataset, have knowledge of any synthetic datasets that have been generated based upon that original dataset.

UI subsystem 170 provides an interface that allows users to interact with data catalog system 120. Users may provide inputs to data catalog system 120 and receive information from data catalog system 120 via UI subsystem 170. For example, user may interact with data catalog system 120 using one or more client devices 190(1) . . . 190(n). In order to facilitate these interactions, UI subsystem 170 may provide graphical user interfaces (GUIs), which may be displayed by client devices 190 used by the users, application programmer interfaces (APIs) such as REST APIs that are callable by users, command line options, and the like. In certain embodiments, UI subsystem 170 may also provide capabilities that enable a user to input metadata for an original dataset and/or a synthetic dataset.

Access management subsystem 150 is responsible for regulating or controlling access to the various datasets and catalogs, including original data catalogs and synthetic data catalogs, generated by data catalog system 120. The access control may be based upon one or more policies 160 configured for the various datasets and data catalogs. Policies 160 may specify policies or rules that indicate which datasets and catalogs can be accessed by which users under what conditions. In certain embodiments, policies 160 may be configured by an administrator of data catalog system 120. Access management subsystem 150 thus provides a governance layer that controls access to the data catalogs and synthetic datasets.

Profiler subsystem 180 is responsible for profiling the original datasets and the synthetic datasets. Profiler subsystem 180 uses various data profiling techniques to analyze the content, quality and structure of the datasets and provide insights into the data. For example, profiler subsystem 180 may provide insights into various column and row level statistics, detect patterns, anomalies, and relationships in the data. The profiling may be performed on a continuous basis as new original datasets are cataloged and new synthetic datasets are created. Various different types of profiling may be performed by profiler subsystem 180 including attribute profiling, structural profiling, and schema profiling. Attribute profiling may include profiling information about min/max/average values for a column with numeric datatypes, min/max/average lengths for columns with string data types, mean, median, standard deviation, frequency distribution, distinct counts, nulls, data types, patterns, domains, etc. Structural profiling may determine information about attribute counts (e.g., number of columns in a dataset), row counts, candidate/primary keys, functional dependencies, record classifications, etc. Schema profiling may determine information about overlap analysis (e.g., determine columns that contain the same data), join conditions, primary key-foreign key (PK-FK) relationships discovery, and the like.

At a high level, data profiling is the process of examining the data available from a dataset and collecting statistics or informative summaries about that data. Data profiling helps an enterprise to: make accurate assessments about data content rather than making assumptions (e.g., ensure that the primary column(s) of a table does not have any null or empty values); validate business semantics of the source (e.g., if a column in a particular source is to contain business phone numbers, then profiling can validate if the column contains proper and valid numbers); and verify data quality reports by comparing the report numbers with profiling results.

Profiler subsystem 180 may use different statistical and analytical algorithms in providing insight into the content of the datasets, and qualitative characteristics of those values. For example, for a database, the profiling information generated by profiler subsystem 180 may include information about the size of the database, the number of tables in the database, the number of files in the database, row counts, column attributes, etc. For a table, the profile may include column description, top values in a column, null count of a column, distinct count, maximum value, minimum value and much more.

Examples of data profiling techniques include: attribute level (read Column) profiling, structural profiling (read Table), schema profiling (read Cross Tables), semantic classification, similarity discovery, recommendations (Joins, Keys, Normalization, Relationships), correlation analysis, rules discovery/rule profiling, outlier/anomaly detection, providing data alerts (when a particular rule conformance on data goes below the acceptable thresholds), and the like.

In certain embodiments, the information determined by profiler subsystem 180 about the datasets, including original and synthetic datasets, is used by catalog generator subsystem 123 for building original data catalogs and synthetic data catalogs. Some of the profiled information may be included in the original and synthetic data catalogs.

Further details related to processing performed by data catalog system 120 for generation of the newly generated datasets and the generation of a data catalog for the synthetic datasets are described below with reference to FIGS. 2, 3, 4, 5, 6, 7, 8, 9, and 10.

Figure 2:
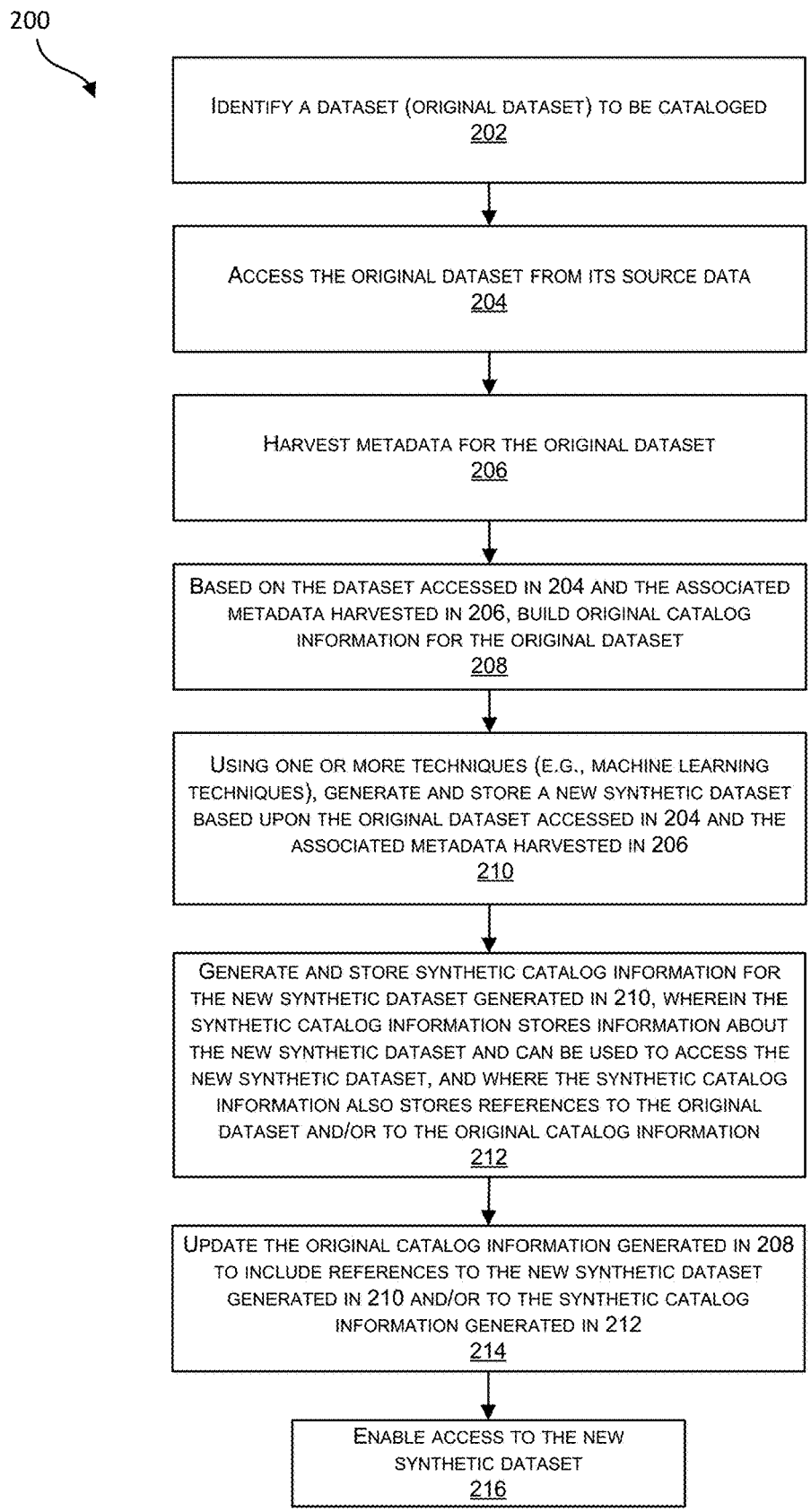
FIG. 2 depicts a simplified flow diagram illustrating an example process for generating and storing synthetic datasets and synthetic dataset catalog information, according to various embodiments.

FIG. 2 depicts a simplified flow diagram illustrating an example process 200 for generating and storing synthetic datasets and synthetic dataset catalog information, according to various embodiments. The processing depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 2 may be performed by data catalog system 120.

Processing may be initiated at 202, where data catalog system 120 identifies an original dataset to be cataloged. There are various different ways in which data catalog system 120 may identify an original dataset to be cataloged. In some instances, as part of 202, a customer or subscriber of data catalog system 120 may specifically identify the original dataset to be cataloged. For example, the customer may identify a specific file, table, or database, etc. to be cataloged. In some other instances, as part of 202, the customer or subscriber may identify one or more data sources, and data catalog system 120 may then crawl those data sources to identify original datasets stored by those data sources that are to be cataloged. In some other instances, as part of 202, the customer or subscriber may identify some criteria related to the datasets to be cataloged. For example, the customer may specify that all "spreadsheets" are to be cataloged. In such a scenario, as part of 202, data catalog system 120 may identify all datasets that meet the criteria and are to be cataloged.

At 204, the original dataset identified in 202 is accessed from its data source. For example, the original dataset identified in 202 may be accessed by data access subsystem 121 of data catalog system 120. The original dataset that is to be cataloged and which is accessed by the data catalog system 120 in 204 can include structured or unstructured data. For purposes of this disclosure, structured data refers to data comprising clearly defined data types with patterns that make the data easily searchable in their dataset. Structured data is usually stored in structured form according to a particular schema or data model. An example of structured data is data stored in a relational databases (RDBMS) with searchable and/or query-able fields. For purposes of this disclosure, data that is not structured is referred to as unstructured data. Searching unstructured data is more difficult than searching structured data. Unstructured data may be textual or non-textual. Examples of unstructured data include text files (e.g., generated by text editing programs, presentations, websites, certain types of messages (e.g., text messages), media data (e.g., digital photos, audio and video files), and the like).

At 206, metadata for the original dataset is harvested. In the embodiment depicted herein, the processing in 206 may be performed by metadata harvester subsystem 122 of data catalog system 120. In some instances, the metadata associated with an original dataset being accessed by data catalog system 120 may already be available and may be accessed by data catalog system 120 in 206. For example, the metadata associated with an original dataset may be stored on the same data source on which the original dataset is stored. Data catalog system 120 may access the metadata from the data source. In other instances, data catalog system 120 may be configured to generate metadata for the original dataset being accessed. This may be done, for example, in situations where no metadata exists for the original dataset being accessed or when the existing metadata for the original dataset may not be sufficient. In this case, as part of the processing performed in 206, a component of data catalog system 120, such as metadata harvester subsystem 122, may introspect the original dataset to generate new metadata for the original dataset.

At 208, based on the dataset accessed in 204 and the associated metadata harvested in 206, original catalog information for the original dataset is generated. For the example embodiment depicted in FIG. 1, the original catalog information may be generated by catalog generator subsystem 123. In various embodiments, the original catalog information generated in 208 for an original dataset may store information such as: information that can be used to access the original dataset (e.g., location where the original dataset is stored), portions of metadata related to the original dataset and which is harvested in 206, properties or status information related to the original dataset, or other information related to the accessed original dataset.

In certain embodiments, if a data catalog already exists for a customer/subscriber for whom the original dataset is being cataloged, then as part of 208, the data catalog may be updated in to include the original catalog information generated in 208. If the original data catalog for the customer does not already exist, then as part of 208, a new data original data catalog may be generated and the original catalog information generated in 208 is added to that original data catalog.

At 210, a new synthetic dataset is generated (and stored) based upon the original dataset accessed in 204 and the associated metadata harvested in 206. In the example embodiment depicted in FIG. 1, the generation of the new synthetic dataset may be done by synthetic dataset generator subsystem 124 of data catalog system 120. Various different techniques may be used to generate the synthetic dataset. As part of the processing in 210, data catalog system 120 generates synthetic data for the original dataset using one or more data generation techniques. In various embodiments, the synthetic data that is generated may comprise one or more new and/or transformed values generated from one or more original values within the original dataset. The synthetic data that is generated is fictitious yet real looking data that is generated based upon the data in the original dataset. The new synthetic dataset that is generated in 210 includes the synthetic data that is generated. The new synthetic dataset generated in 210 may also include portions or all of the data in the original dataset, which is the basis for the generation of the synthetic data.

As indicated above, various techniques may be used in 210 to generate synthetic data and a synthetic dataset using the synthetic data. The synthetic data generation techniques may include one or more machine-learning techniques. For example, according to a machine learning technique, an original dataset may be input to a machine-learning model (e.g., a trained convolutional neural network machine-learning model) and the model may generate a synthetic dataset that includes synthetic data. The original dataset may be input to the ML model as a single consistent data set or as multiple subsets of the original dataset. For example, if an original dataset comprises a tabular row-and-column format, the original dataset may be input to the ML model as one consistent table or as multiple subsets of the table, such as a plurality of columns of the table. In the former example, the ML model may use the one consistent table to replicate and replace values in a new synthetic consistent table. In the latter example, an ML model may be configured to generate synthetic data for the columnar data individually and then combine the columnar data into a new synthetic table.

Different machine-learning techniques and models may be used for generating different types of synthetic datasets in 210. As one example, the data catalog system may determine that the original dataset has portions of data that are missing (e.g., there may identify holes or gaps in the original dataset) and may generate a synthetic dataset in which the missing data is filled in with automatically generated synthetic data. As another example, the data catalog system may determine that the original dataset contains restricted data (e.g., personal identifiable information (PII), data that is restricted by laws or regulations, data that is tagged by the enterprise as being restricted, etc.) and may generate a synthetic dataset based upon the original dataset where the restricted data in the original dataset is replaced with synthetically generated data. As yet another example, the data catalog system may generate synthetic data to augment an original dataset that is cataloged. For example, the data catalog system may generate a synthetic dataset that contains data from the original dataset and additionally contains new synthetic data. As yet another example, the data catalog system may generate a new synthetic dataset that entirely contains new synthetic data generated based an original dataset and which retains certain attributes/characteristics from the original enterprise dataset. Different techniques, including different machine-learning techniques and models may be used to generate the various different types of synthetic dataset described above.

The synthetic dataset generated in 210 may then be stored on a storage medium. For example, the synthetic dataset may be stored in data store 130 of data catalog system 120. In certain embodiments, the synthetic dataset may be stored where the original dataset is stored, for example, on the same data source as the original dataset. In general, the synthetic dataset generated in 210 may be stored in any memory location accessible to data catalog system 120.

At 212, synthetic catalog information is generated (and stored) for the new synthetic dataset generated in 210. In the example embodiment depicted in FIG. 1, the processing in 212 may be performed by catalog generator subsystem 123. The generated synthetic catalog information may be stored in a memory location accessible to data catalog system 120. For example, the synthetic catalog information may be stored on data store 130 of data catalog system 120.

If the synthetic dataset generated in 210 is part of a set of synthetic datasets, and a synthetic data catalog has already been generated for the set, then the synthetic catalog information generated in 212 may be added to that synthetic data catalog. If the synthetic data catalog does not already exists, then a new synthetic data catalog may be generated, and the synthetic catalog information generated in 212 is added to that synthetic data catalog.

The synthetic catalog information generated in 212 for the synthetic dataset generated in 210 may store information about that synthetic dataset. For example, the synthetic catalog information may store information that can be used to access the synthetic dataset generated in 211. The synthetic catalog information may also store other information related to the synthetic dataset such as metadata information related to the synthetic dataset. In certain embodiments, the format of the synthetic catalog information may be similar to the format of the original catalog information generated in 208.

Additionally, in certain embodiments, the synthetic catalog information generated in 212 also includes references to the original dataset that was the basis for the generation of the synthetic dataset and/or to the original catalog information generated for that original dataset in 208. These references inform a user of the synthetic dataset about the original dataset that was the basis for generation of the synthetic dataset and the original catalog information generated for that original dataset. These references also may enable a user of the synthetic dataset to access the original dataset or its related catalog information.

At 214, the original catalog information generated in 208 is updated to include references to the new synthetic dataset generated in 210 and/or to the synthetic catalog information generated in 212. In various embodiments, updating the original catalog information comprises adding information to the original catalog information specifying the new synthetic dataset generated in 210 and information identifying where the generated synthetic dataset is stored. In this manner, the original catalog information is updated such that it can be used to access the synthetic dataset or information about the synthetic dataset. The references also indicate to a user of the original dataset and its associated original catalog information that a synthetic dataset exists that has been generated based upon the original dataset and information about that generated synthetic dataset. In combination with 212, both the original catalog information for the original dataset and the synthetic catalog information generated for the synthetic dataset store references to each other, as well as their associated datasets.

At 216, access to the new synthetic dataset is enabled. In various embodiments, access to synthetic datasets generated by data catalog system 120 may be governed based upon policies, such as policies 160, configured for the synthetic datasets. For example, in the embodiment depicted in FIG. 1, access management subsystem 150 may control access to the generated synthetic datasets and their associated synthetic catalog information based upon policies 160. A policy may specify which users are allowed to access which synthetic datasets. In certain implementations, in a system having multiple access levels, a policy may identify a minimum access level that is required to access a particular synthetic dataset and its associated synthetic catalog information. A user is allowed to access the particular synthetic dataset and its associated synthetic catalog information only if an access level associated with the user is the same as or higher than the minimum access level specified for accessing that particular synthetic dataset. In certain embodiments, access management subsystem 150 may also use policies 160 to control access to original catalog information 141 that is generated by data catalog system 120 for original datasets.

Various other access control models may be configured for data catalog system 120. The synthetic dataset that are generated as described above can be used for various different purposes. According to one use case, they can be used as training data for training machine-learning models. For example, one or more generated synthetic datasets may be input into a machine-learning model to cause training of the model. The one or more generated synthetic datasets may be parsed by the machine-learning model to cause altering the parameters of the model based on the data in the synthetic dataset. The machine-learning model may output one of more sets of output data based on the input. The output data may be compared to a set of ground-truth data to determine the result of the training.

Processes for generating synthetic data for building a new synthetic dataset to improve upon an original dataset as discussed herein, including with reference to FIGS. 4-10.

Figure 3:
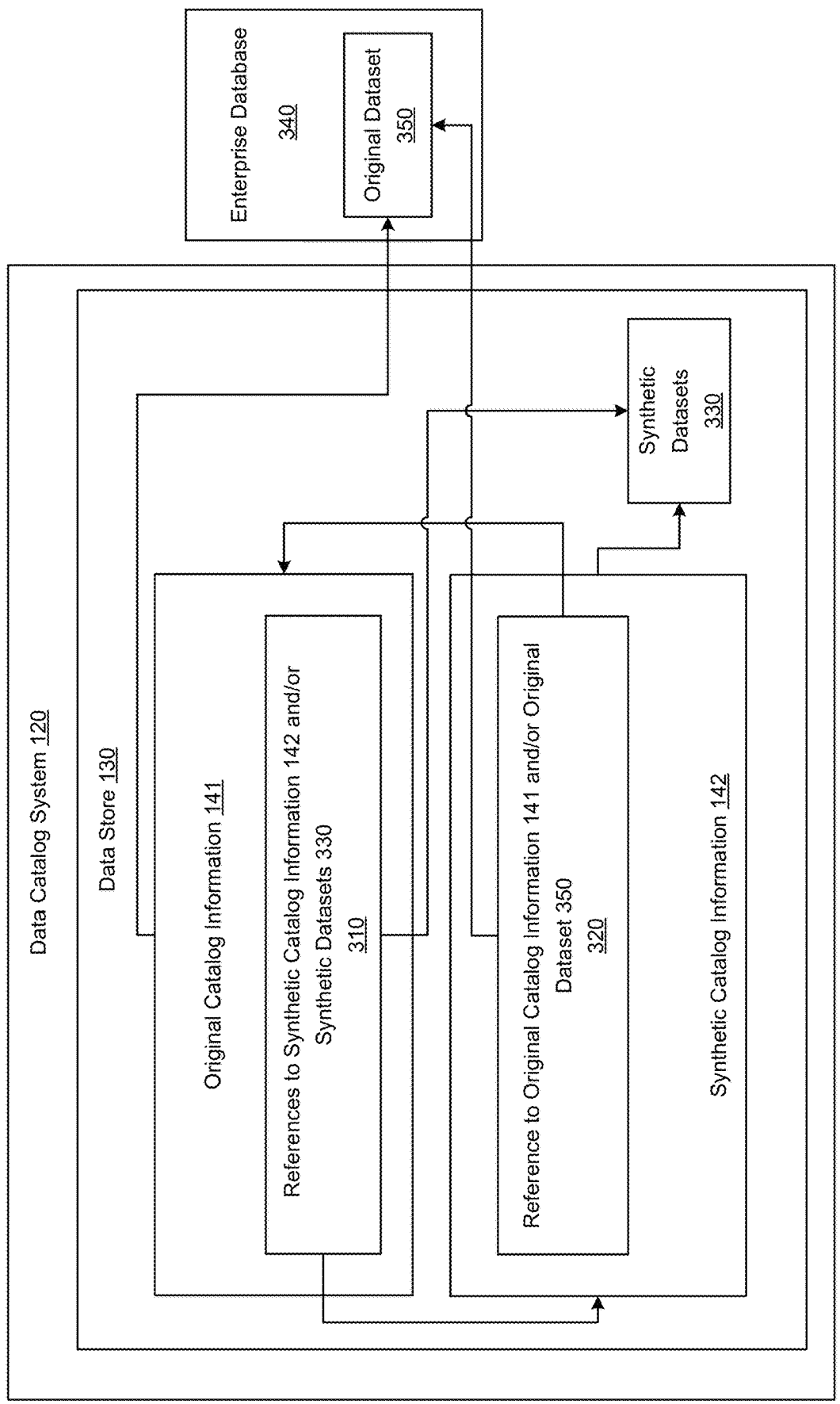
FIG. 3 depicts a data catalog system including references to original and synthetic catalog information, according to various embodiments.

FIG. 3 depicts a data catalog system including references to original and synthetic catalog information, according to various embodiments. For example, the original catalog information may be generated in block 212 and the synthetic catalog information may be generated in block 214 of process 200 depicted in FIG. 2. As depicted in FIG. 3, the data catalog system 120 may comprise data store 130. Data store 130 may store original catalog information 141, synthetic catalog information 142 generated by data catalog system 120, and synthetic datasets 330 generated by data catalog system 120.

As depicted in FIG. 3, once synthetic dataset 330 has been generated for an original dataset 350 (which may be stored in a separate enterprise database 340), the original catalog information 141 generated by data catalog system 120 for original dataset 350, may be updated by data catalog system 120 to include one or more references 310 to the synthetic dataset 330 that was generated and/or to the synthetic catalog information 142 generated for that synthetic dataset. These references indicate to an entity accessing original dataset 350 or of original catalog information 141 that a synthetic dataset 330 and associated catalog information 142 have been generated based upon the original dataset 350.

As depicted in FIG. 3, when data catalog system 120 generates synthetic catalog information 142 for synthetic dataset 330, in addition to storing information related to the synthetic dataset and information for accessing the synthetic dataset, the synthetic catalog information 142 additionally comprises one or more references to the synthetic dataset 330 that was the basis for generating synthetic dataset 330 and/or original catalog information 141 that was generated for the original dataset 350. These references enable a user of synthetic dataset 330 or of synthetic catalog information 142 generated for that synthetic dataset to access to know of the original dataset and to, if desired, access the original dataset using information in the synthetic catalog information 142.

Figure 4:
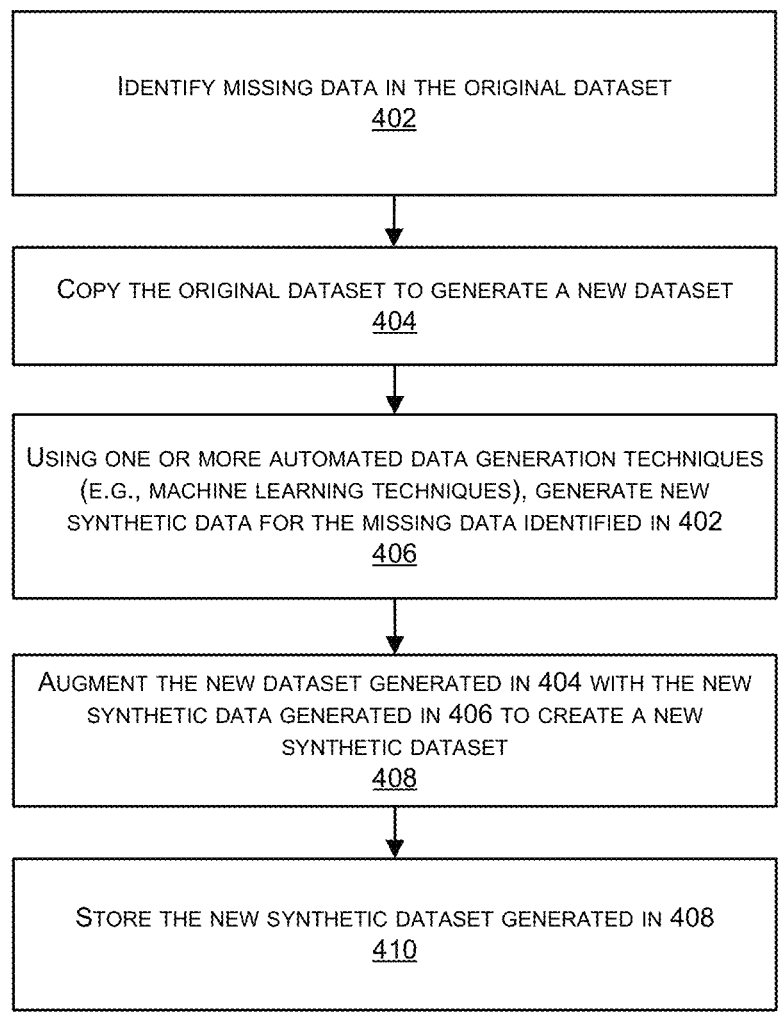
FIG. 4 depicts a simplified flow diagram illustrating an example process for generating and augmenting a new dataset using generated synthetic data, according to various embodiments.

FIG. 4 depicts a simplified flow diagram illustrating an example process for generating and augmenting a new dataset using generated synthetic data, according to various embodiments. The processing depicted in FIG. 4 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 4 may be performed by synthetic dataset generator subsystem 124 of data catalog system 120.

Process 400 may be initiated at 402 where data catalog system 120 identifies missing data in an original dataset. For example, data catalog system 120 may parse an original dataset to identify the missing data in the original dataset. In some instances, metadata harvester subsystem 122 may parse metadata associated with the original dataset to determine that one or more data values are missing or are represented by null values.

At 404, the original dataset is copied to generate a new dataset. In the example embodiment depicted in FIG. 1, the copying of the original dataset and generation of the new dataset may be done by synthetic dataset generator subsystem 124 of data catalog system 120. In some instances, a new blank dataset is generated having a size and format similar to the original dataset. The new blank dataset is then populated with data taken from the original dataset.

At 406, new synthetic data is generated based upon the original dataset identified in 402. In the example embodiment depicted in FIG. 1, the generation of the new synthetic data may be done by synthetic dataset generator subsystem 124 of data catalog system 120. Various different techniques may be used to generate the synthetic data, including the techniques described in block 210 of FIG. 2. In various embodiments, the synthetic data that is generated may comprise one or more new and/or transformed values generated from one or more original values within the original dataset, the one or more new and/or transformed values capable of inclusion in the generated new dataset in 404. As one example, the data catalog system 120 may determine that the original dataset has portions of data that are missing (e.g., it may identify holes or gaps in the original dataset) and may automatically generate synthetic data to augment portions of the generated new dataset containing the missing data. The generated synthetic data may be in a format corresponding to a category of the generated new dataset in which data is missing. For example, a data category of the generated new dataset may correspond to location-based values comprising a city-and-state string. Location-based values may be missing from the generated new dataset. The synthetic data will accordingly be generated in a city-and-state string format to replace the missing values.

At 408, the new dataset generated in 404 is augmented with the new synthetic data generated in 406 to create a new synthetic dataset. Augmentation comprises replacement of the missing data identified in 402 in the new dataset generated in 404 with corresponding synthetic data generated in 406 to complete the new synthetic dataset. For example, one or more null values identified in the original dataset in 402, and copied to the new dataset generated in 404, may be removed and replaced with the synthetic data generated in 406.

Figure 7:
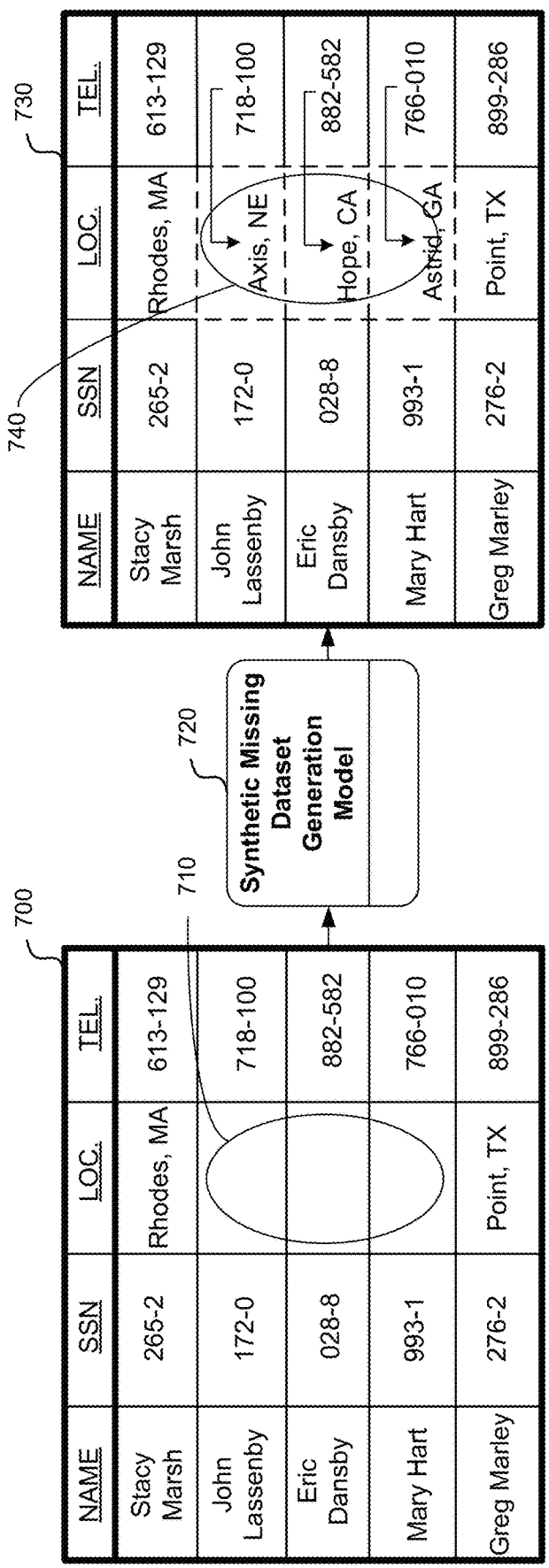
FIG. 7 depicts an example of synthetic dataset generation by augmenting a dataset with missing data values, according to various embodiments.

At 410, the new synthetic dataset generated in 408 is stored. The synthetic dataset created in 408 may be stored on a storage medium. For example, the new synthetic dataset may be stored in data store 130 of data catalog system 120. Various techniques may be used to store the new synthetic dataset, including those discussed with reference to block 210 in FIG. 2. An example illustration of process 400 is depicted in FIG. 7 below.

Figure 5:
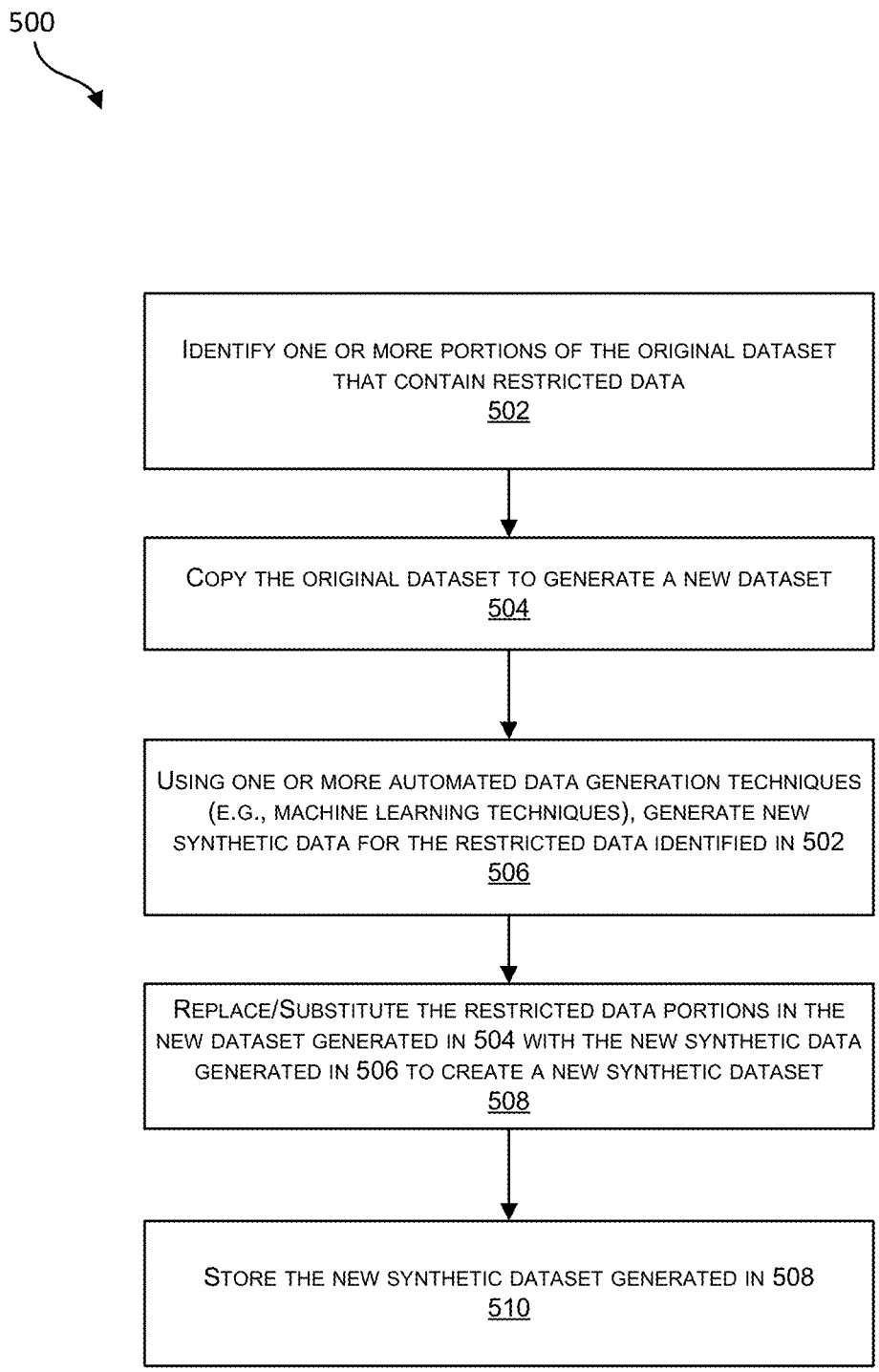
FIG. 5 depicts a simplified flow diagram illustrating an example process for generating a new dataset and replacing restricted data using generated synthetic data, according to various embodiments.

FIG. 5 depicts a simplified flow diagram illustrating an example process for generating a new dataset and replacing restricted data using generated synthetic data, according to various embodiments. The processing depicted in FIG. 5 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 5 may be performed by synthetic dataset generator subsystem 124 of data catalog system 120.

Process 500 may be initiated at 502 where data catalog system 120 identifies one or more portions an original dataset that contain restricted data. For example, data catalog system 120 may parse an original dataset to identify the one or more portions of the original dataset containing data that corresponds to PII or sensitive data. In some instances, metadata harvester subsystem 122 may parse metadata associated with the original dataset to determine the one or more portions of the original dataset that contain restricted data.

At 504, the original dataset is copied to generate a new dataset. In the example embodiment depicted in FIG. 1, the copying of the original dataset and generation of the new dataset may be done by synthetic dataset generator subsystem 124 of data catalog system 120. In some instances, a new blank dataset is generated having a size and format similar to the original dataset. The new blank dataset is then populated with data taken from the original dataset.

At 506, new synthetic data is generated based upon the original dataset identified in 402. In the example embodiment depicted in FIG. 1, the generation of the new synthetic data may be done by synthetic dataset generator subsystem 124 of data catalog system 120. Various different techniques may be used to generate the synthetic data, including the techniques described in block 210 of FIG. 2. In various embodiments, the synthetic data that is generated may comprise one or more new and/or transformed values generated from one or more original values within the original dataset, the one or more new and/or transformed values capable of inclusion in the generated new dataset in 504. As one example, the data catalog system 120 may determine that the original dataset has portions of data that are restricted (e.g., the data corresponds to PII such as social security numbers, home addresses, information about family members, etc.) and may generate synthetic data that will replace the restricted data in the identified portions of the generated new dataset. The generated synthetic data may be in a format corresponding to a portion of the generated new dataset in which restricted data is identified. For example, a data category of the generated new dataset may correspond to social security numbers having a certain number of sequential numerical values. Sequences of numerical values of the same length will accordingly be generated to replace the existing restricted social security values. These values would appear to be social security values and may be processed as such, but will not pose a risk of information exposure to individuals if used or disseminated.

At 508, the new synthetic data generated in 506 replaces/is substituted for the restricted in the new dataset copied in 504 to create a new synthetic dataset. Replacement/substitution comprises replacement/substitution of restricted data with the new synthetic data generated in 506 in the one or more identified portions. For example, one or more portions containing PII data identified in the original dataset in 402, replace the PII data with the new synthetic data generated in 506.

Figure 8:
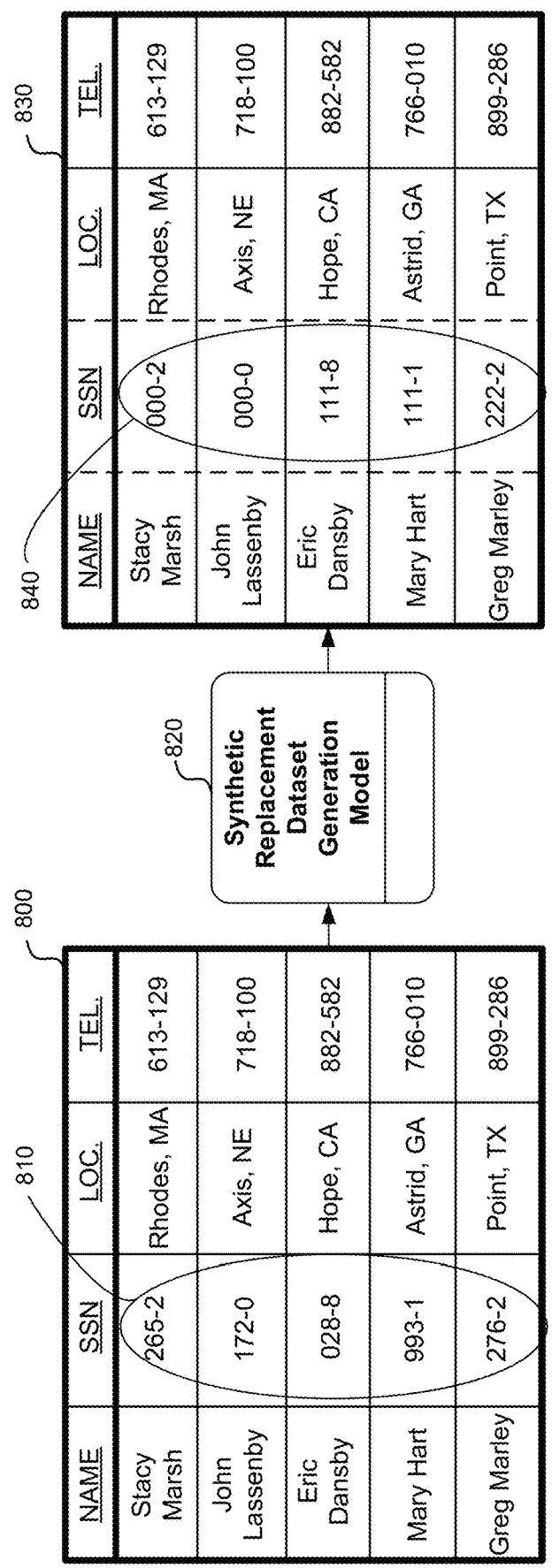
FIG. 8 depicts an example of synthetic dataset generation by replacing restricted data values in a dataset, according to various embodiments.

At 510, the new synthetic dataset generated in 508 is stored. The synthetic dataset created in 508 may be stored on a storage medium. For example, the new synthetic dataset may be stored in data store 130 of data catalog system 120. Various techniques may be used to store the new synthetic dataset, including those discussed with reference to block 210 in FIG. 2. An example illustration of process 500 is depicted in FIG. 8 below.

Figure 6A:
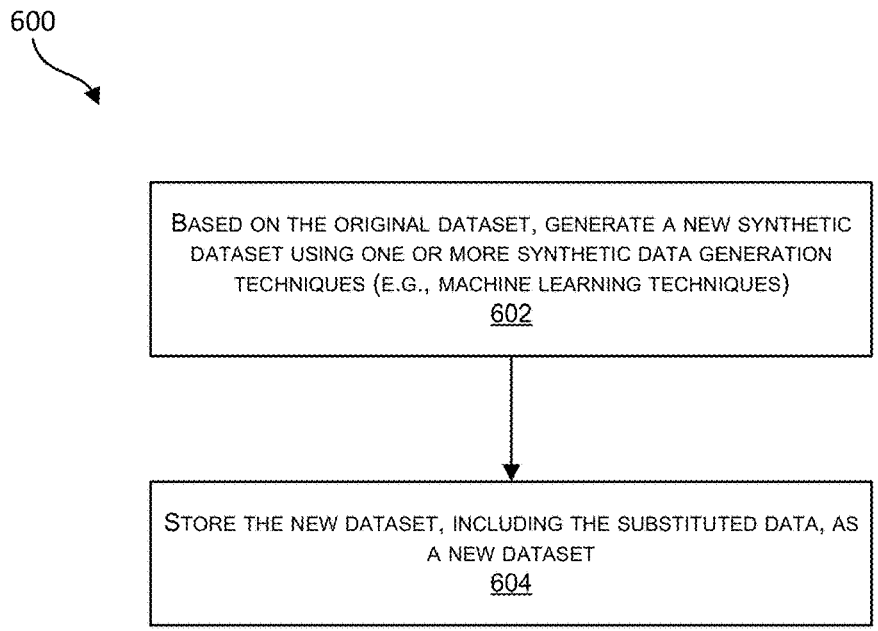
FIG. 6A depicts a simplified flow diagram illustrating an example process for generating a new dataset from an original dataset using synthetic dataset generation, according to various embodiments.

FIG. 6A depicts a simplified flow diagram illustrating an example process for generating a new dataset from an original dataset using synthetic dataset generation, according to various embodiments. The processing depicted in FIG. 6A may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 6A and described below is intended to be illustrative and non-limiting. Although FIG. 6A depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 6A may be performed by synthetic dataset generator subsystem 124 of data catalog system 120 for generating a new synthetic dataset from an original dataset, according to various embodiments.

Process 600 may be initiated at 602, where a new synthetic dataset is generated based upon an original dataset using one or more synthetic data generations techniques. In the example embodiment depicted in FIG. 1, the generation of the new synthetic dataset may be done by synthetic dataset generator subsystem 124 of data catalog system 120. Various different techniques may be used to generate the synthetic dataset. As part of the generation in 602, data catalog system 120 generates synthetic data for the original dataset using one or more data generation techniques. In various embodiments, the synthetic data that is generated may comprise one or more new and/or transformed values generated from one or more original values within the original dataset. The synthetic data that is generated is fictitious yet real looking data that is generated based upon the data in the original dataset. The new synthetic dataset that is generated in 602 includes the synthetic data that is generated. The new synthetic dataset generated in 602 may also include portions or all of the data in the original dataset, which is the basis for the generation of the synthetic data.

As indicated above, various techniques may be used in 602 to generate synthetic data and a synthetic dataset using the synthetic data. The synthetic data generation techniques may include one or more machine-learning techniques such as those described with reference to block 210 of FIG. 2. The generated new synthetic dataset may have a similar format to that of the original dataset but with a subset of the original data values of the original dataset substituted with the generated synthetic data.

Figure 9:
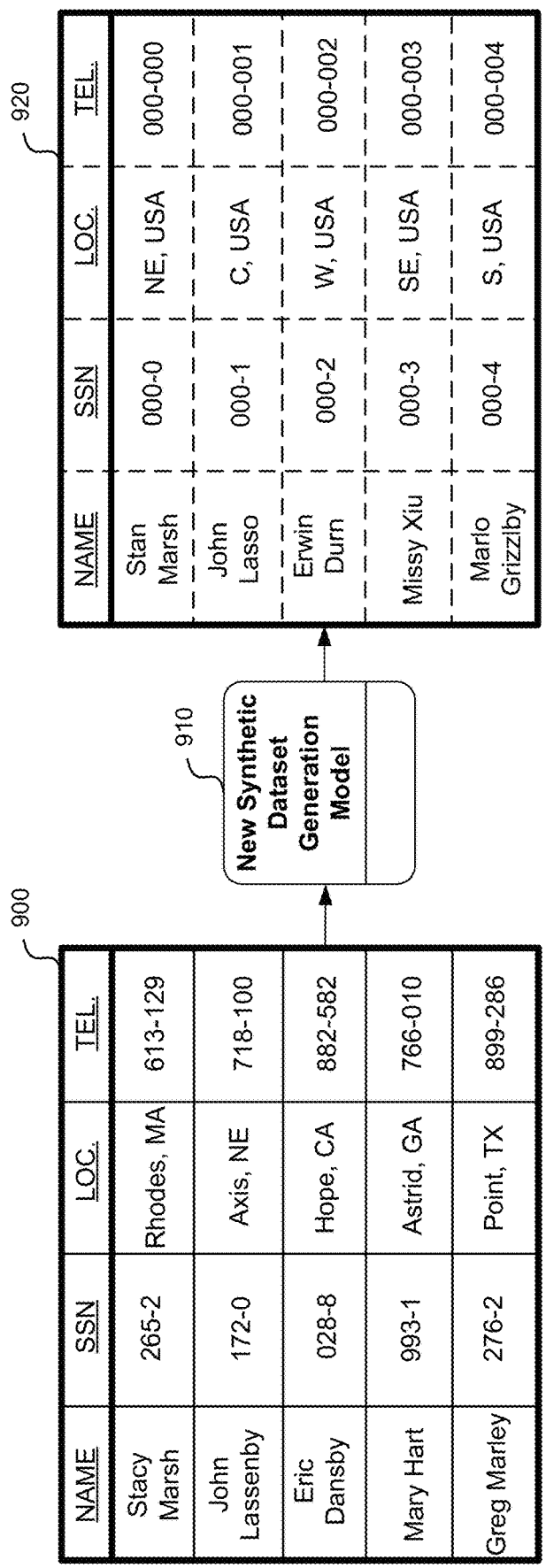
FIG. 9 depicts an example of new synthetic dataset generation using an existing dataset, according to various embodiments.

At 604, the new synthetic dataset generated in 602 is stored. The synthetic dataset created in 602 may be stored on a storage medium. For example, the new synthetic dataset may be stored in data store 130 of data catalog system 120. Various techniques may be used to store the new synthetic dataset, including those discussed with reference to block 210 in FIG. 2. An example illustration of process 600 is depicted in FIG. 9 below.

Figure 6B:
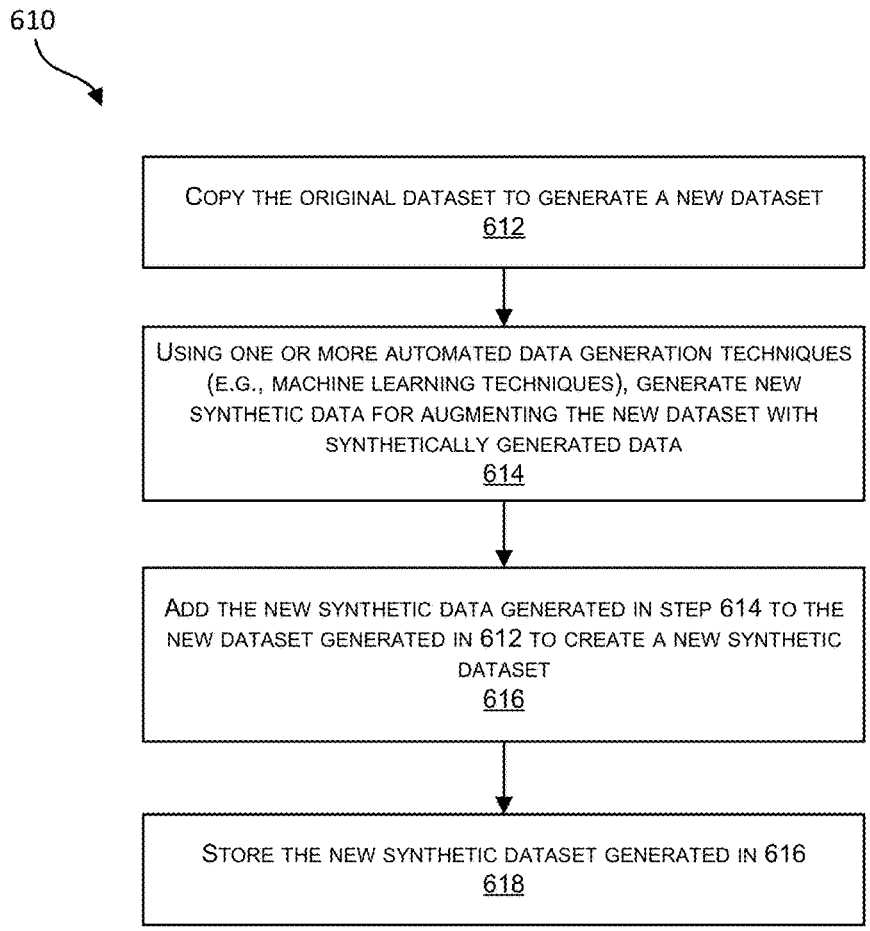
FIG. 6B depicts a simplified flow diagram illustrating an example process for augmenting an original dataset to create a new synthetic dataset, according to various embodiments.

FIG. 6B depicts a simplified flow diagram illustrating an example process for augmenting an original dataset to create a new synthetic dataset, according to various embodiments. The processing depicted in FIG. 6B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 6B and described below is intended to be illustrative and non-limiting. Although FIG. 6B depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 1, the processing depicted in FIG. 6B may be performed by synthetic dataset generator subsystem 124 of data catalog system 120.

Process 610 may be initiated at 612 where an original dataset is copied to generate a new dataset. In the example embodiment depicted in FIG. 1, the copying of the original dataset and generation of the new dataset may be done by synthetic dataset generator subsystem 124 of data catalog system 120. In some instances, a new blank dataset is generated having a size and format similar to the original dataset. The new blank dataset is then populated with data taken from the original dataset.

At 614, new synthetic data is generated based upon the original dataset identified in 402. In the example embodiment depicted in FIG. 1, the generation of the new synthetic data may be done by synthetic dataset generator subsystem 124 of data catalog system 120. Various different techniques may be used to generate the synthetic data, including the techniques described in block 210 of FIG. 2. In various embodiments, the synthetic data that is generated may comprise one or more new and/or transformed values generated from one or more original values within the original dataset, the one or more new and/or transformed values capable of inclusion in the generated new dataset. As one example, the data catalog system 120 may determine that the original dataset has portions of data may be used to derive additional portions/categories of the new dataset (e.g., telephone numbers comprising area codes may be used to identify corresponding city-and-state location values) and may automatically generate synthetic data to augment portions of the generated new dataset.

At 616, the new dataset generated in 612 is augmented by adding the new synthetic data generated in 614 to the new dataset to create a new synthetic dataset. Addition/augmentation comprises the addition of a new portion/category of data to the new dataset generated in 612 to create the new synthetic dataset.

Figure 10:
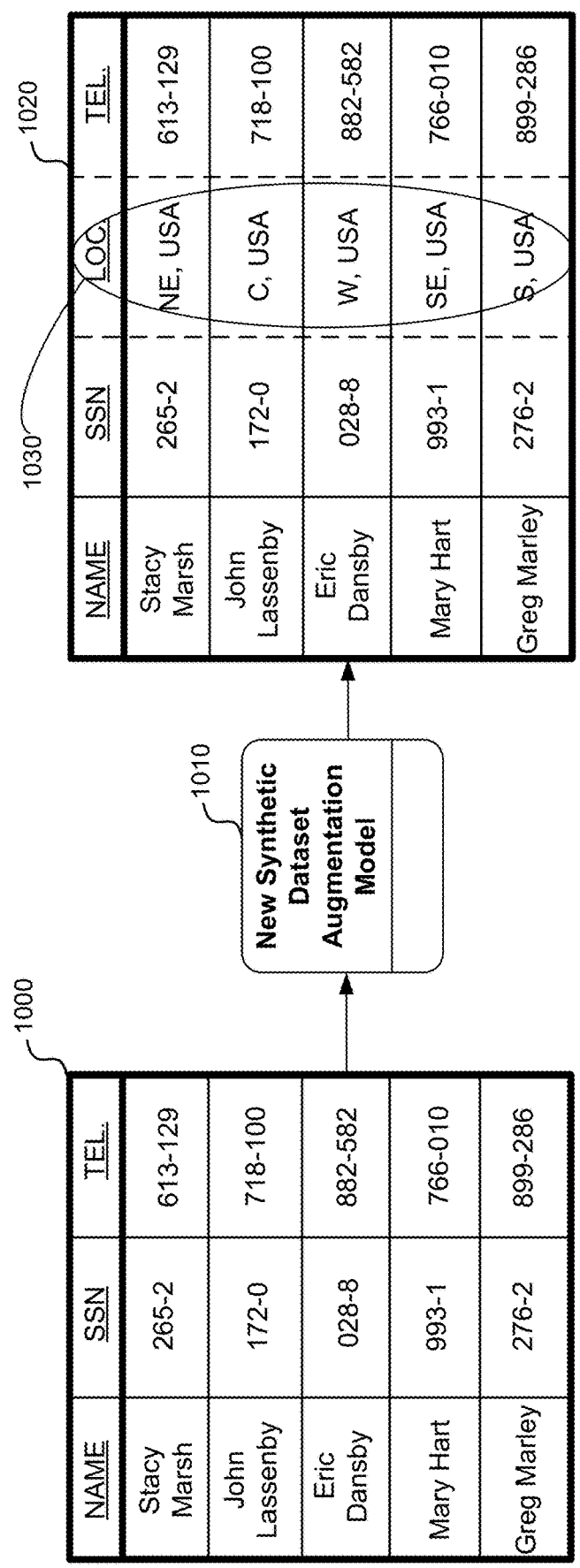
FIG. 10 depicts an example of synthetic dataset generation by augmenting a dataset with additional values, according to various embodiments.

At 618, the new synthetic dataset generated in 616 is stored. The synthetic dataset created in 616 may be stored on a storage medium. For example, the new synthetic dataset may be stored in data store 130 of data catalog system 120. Various techniques may be used to store the new synthetic dataset, including those discussed with reference to block 210 in FIG. 2. An example illustration of process 610 is depicted in FIG. 10 below.

FIG. 7 depicts an example of synthetic dataset generation by augmenting a dataset with missing data values, according to various embodiments. Specifically, FIG. 7 depicts input of an original dataset into a machine-learning model to produce a new synthetic dataset. Original dataset 700 may be an original dataset stored in an enterprise data store which is known to a data catalog via original reference information. For example, as depicted in FIG. 7, an original dataset is a row-and-column dataset comprising columnar values corresponding to values for a "NAME," "SOCIAL SECURITY NUMBER (SSN)," "LOCATION (LOC.)," and "TELEPHONE NUMBER (TEL.)." Original dataset 700 may comprise missing data 710. For example, as depicted in FIG. 7, a subset of data values in the "LOC." column are not present or are null.

In response to determining that original dataset 700 has one or more missing values (such as in 402 of FIG. 4), original dataset 700 may be input into synthetic missing dataset generation model 720 (such as in 406 of FIG. 4). Synthetic missing dataset generation model 720 may be a machine-learning model such as a convolutional neural network model which will take, as input, the original dataset 700 to produce synthetic data values for a new synthetic dataset. Specifically, synthetic missing dataset generation model 720 may output synthetic data values to populate new synthetic dataset 730. Augmented values 740 may be output from the model and used to augment new synthetic dataset 730 (such as in 408 of FIG. 4). For example, as depicted in FIG. 7, augmented values 740 corresponding to synthetically generated "LOC." data values are used to augment the new synthetic dataset 730. The augmented values are generated based on the "TEL." values in the original dataset 700 and copied to the new synthetic dataset 730. For example, the synthetic missing dataset generation model 720 may map area codes present in the "TEL." values to a corresponding location in a location database to generate output comprising synthetic location values for augmenting the new synthetic dataset 730.

FIG. 8 depicts an example of synthetic dataset generation by replacing restricted data values in a dataset, according to various embodiments. Specifically, FIG. 8 depicts input of an original dataset into a machine-learning model to produce a new synthetic dataset. Original dataset 800 may be an original dataset stored in an enterprise data store which is known to a data catalog via original reference information. For example, as depicted in FIG. 8, an original dataset is a row-and-column dataset similar to FIG. 7. Original dataset 800 may comprise restricted data 810. For example, as depicted in FIG. 8, a subset of data values in the "SSN" column represent entity social security numbers, which are sensitive information not fit for dissemination according to a set of policies.

In response to determining that original dataset 800 has one or more restricted values (such as in 502 of FIG. 5), original dataset 800 may be input into synthetic replacement dataset generation model 820. Synthetic replacement dataset generation model 820 may be a machine-learning model such as a convolutional neural network model which will take, as input, the original dataset 800 to produce synthetic data values for a new synthetic dataset (such as in 506 of FIG. 5). Specifically, synthetic replacement dataset generation model 820 may output synthetic data values to populate new synthetic dataset 830. Replacement values 840 may be output from the model and used to substitute/replace data values in new synthetic dataset 830 (such as in 508 of FIG. 5). For example, as depicted in FIG. 8, replacement values 840 corresponding to synthetically generated "SSN" data values are used to replace previous "SSN" values in the original dataset 800. The augmented values are generated based on the "SSN" values in the original dataset 700 and some random number noise. For example, the synthetic replacement dataset generation model 820 may map social security numbers present in the "SSN" values of the original dataset 800 to a corresponding randomly generating random number string to generate the replacement values 840.

FIG. 9 depicts an example of new synthetic dataset generation using an existing dataset, according to various embodiments. Specifically, FIG. 9 depicts input of an original dataset into a machine-learning model to produce a new synthetic dataset. Original dataset 900 may be an original dataset stored in an enterprise data store which is known to a data catalog via original reference information. For example, as depicted in FIG. 9, an original dataset is a row-and-column dataset similar to FIGS. 7 and 8.

In various embodiments, original dataset 900 may be input into new synthetic dataset generation model 910. New synthetic dataset generation model 910 may be a machine-learning model such as a convolutional neural network model which will take, as input, the original dataset 900 to produce synthetic data values for a new synthetic dataset. Specifically, new synthetic dataset generation model 910 may output synthetic data values to populate new synthetic dataset 920. For example, as depicted in FIG. 9, generated data values are used to build a new synthetic dataset 730 (such as in 602 of FIG. 6A). The synthetic data values may be based on corresponding values in the original dataset 900. For example, the new synthetic dataset generation model 910 may map each value in the original dataset 900 with a set of noise, randomly generated values, and/or additional database entries. The mapping may cause generation of new synthetic data values which can be used to populate new synthetic dataset 920. For example, the values in new synthetic dataset 920 appear somewhat similar to values in original dataset 900 but with some differences.

FIG. 10 depicts an example of synthetic dataset generation by augmenting a dataset with additional values, according to various embodiments. Specifically, FIG. 10 depicts input of an original dataset into a machine-learning model to produce a new synthetic dataset. Original dataset 1000 may be an original dataset stored in an enterprise data store which is known to a data catalog via original reference information. For example, as depicted in FIG. 10, an original dataset is a row-and-column dataset similar to FIGS. 7, 8 and 9 but without a "LOC." column.

In various embodiments, original dataset 1000 may be input into new synthetic dataset augmentation model 1010. New synthetic dataset augmentation model 1010 may be a machine-learning model such as a convolutional neural network model which will take, as input, the original dataset 1000 to produce synthetic data values for a new synthetic dataset (such as in 614 of FIG. 6B). Specifically, new synthetic dataset augmentation model 1010 may output synthetic data values to populate new synthetic dataset 1020. Augmented values 1030 may be output from the model and used to augment new synthetic dataset 1020 (such as in 616 of FIG. 6B). For example, as depicted in FIG. 10, augmented values 1030 corresponding to a synthetically generated "LOC." category of data values are used to augment the new synthetic dataset 1020. The augmented values are generated based on the "TEL." values in the original dataset 1000 and copied to a new dataset category of the new synthetic dataset 1020. For example, the new synthetic dataset augmentation model 1010 may map area codes present in the "TEL." values of the original dataset 1000 to a corresponding location in a location database to generate output comprising synthetic location values for augmenting the new synthetic dataset 1020.

In certain embodiments, the data cataloging and synthetic dataset generation functionalities may be provided as cloud services by a cloud services provider. For example, a cloud services provider may provide Infrastructure-as-a-Service (IaaS) services that provide computing, memory, and networking resources that can be used by a subscribing customer. A customer may use the infrastructure resources provided by the IaaS services provider to run their compute loads (e.g., applications, virtual machines, containers, etc.). The IaaS provider may also provide cloud services to its customers which facilitate data cataloging and synthetic dataset generation functionalities. An example architecture/infrastructure is described below. The example architecture/infrastructure may be independent from the systems described herein that facilitate data cataloging and synthetic dataset generation. However, the independent example architecture/infrastructure may be utilized to support those data cataloging and synthetic dataset generation systems in performing the processes described herein.

Example Infrastructure-as-a-Service Implementation

Figure 11:
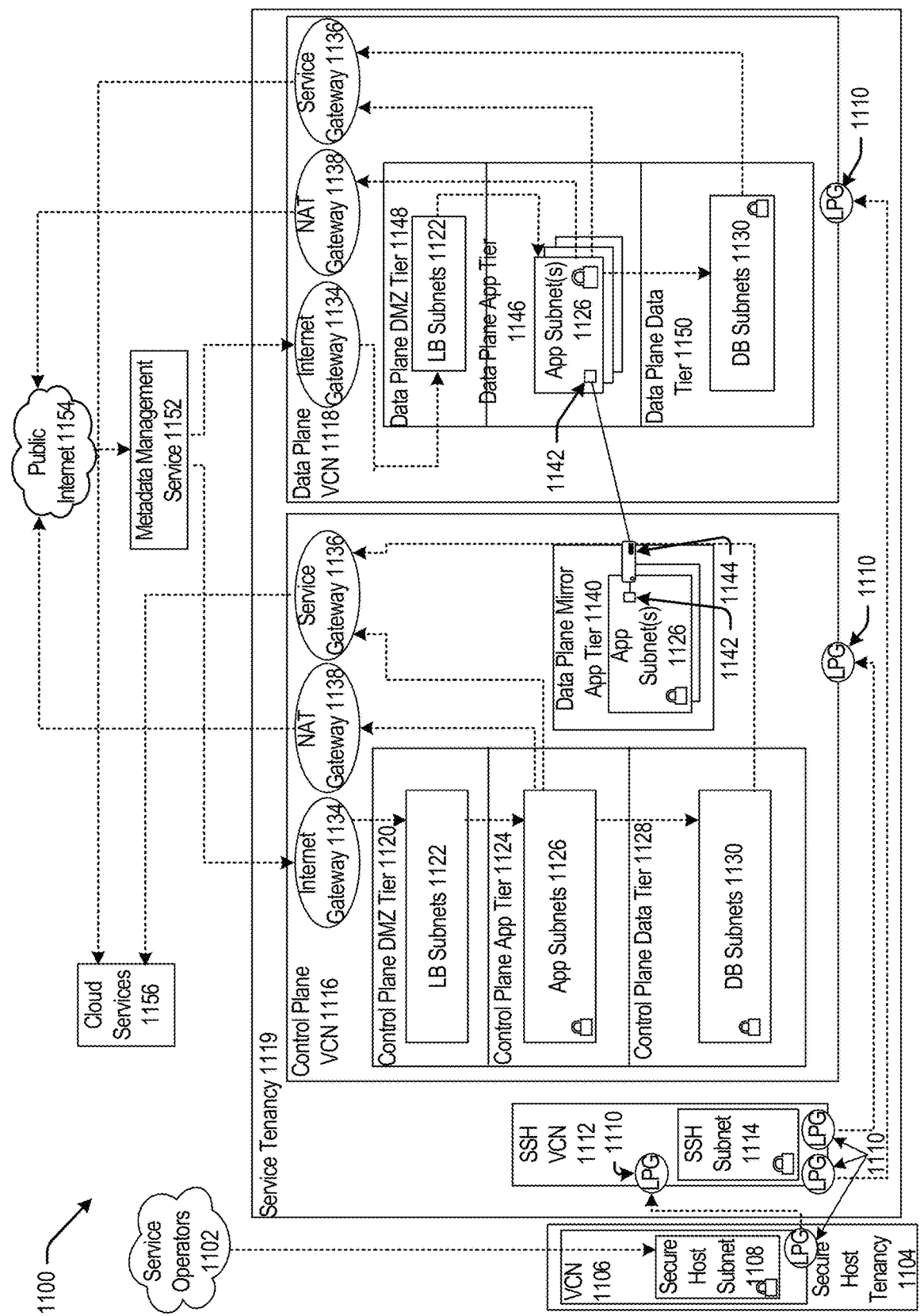
FIG. 11 is a block diagram illustrating one pattern for implementing a cloud infrastructure as a service system, according to at least one embodiment.

FIG. 11 depicts an example cloud infrastructure that may be used to provide a data harvesting and cataloging service for storing and utilizing source datasets, according to various embodiments. As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 11 is a block diagram 1100 illustrating an example pattern of an IaaS architecture, according to at least one embodiment. Service operators 1102 can be communicatively coupled to a secure host tenancy 1104 that can include a virtual cloud network (VCN) 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway (LPG) 1110 that can be communicatively coupled to a secure shell (SSH) VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone (DMZ) tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer (LB) subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively coupled to cloud services 1156.

In some examples, the service gateway 1136 of the control plane VCN 1116 or of the data plane VCN 1118 can make application programming interface (API) calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete (CRUD) operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 12:
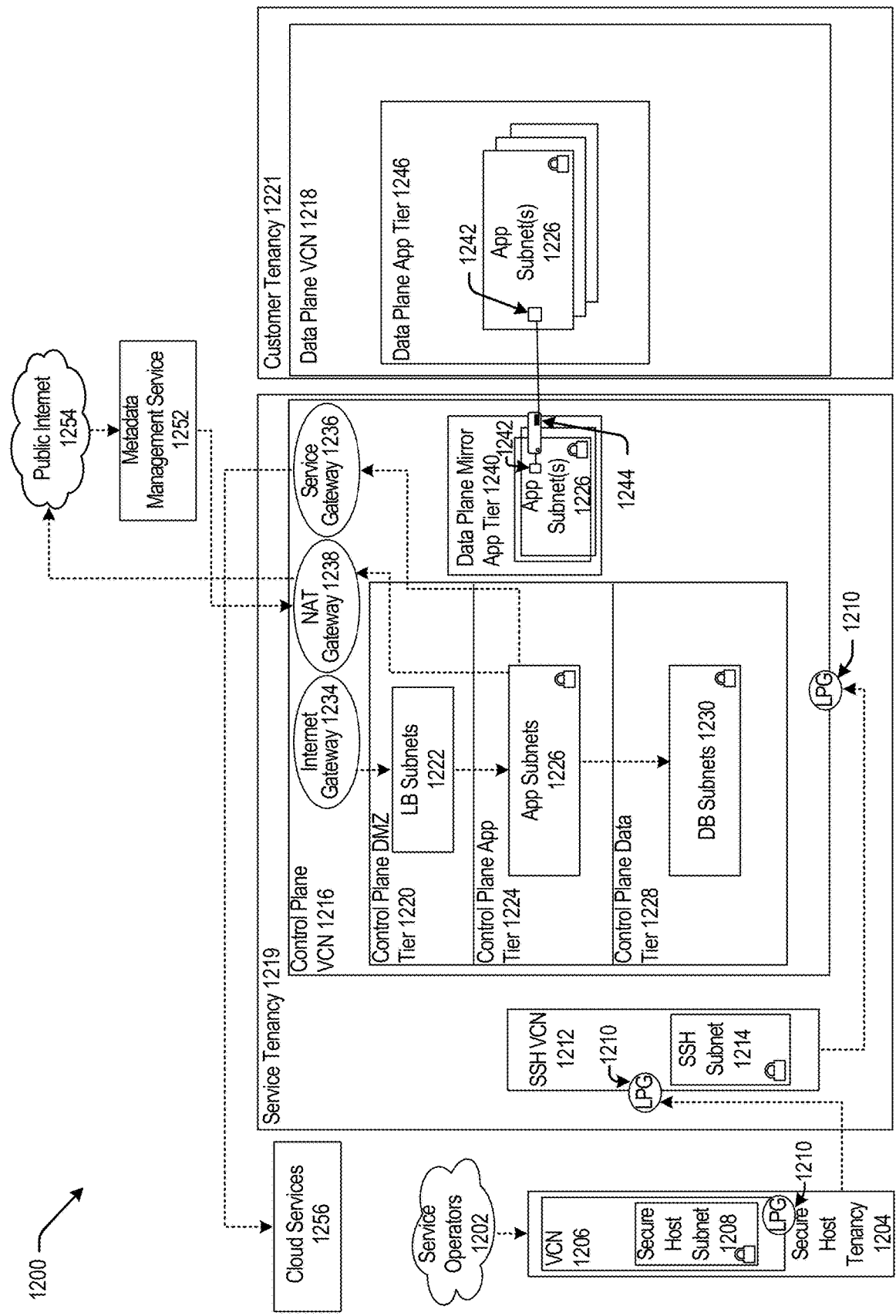
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 1102 of FIG. 11) can be communicatively coupled to a secure host tenancy 1204 (e.g. the secure host tenancy 1104 of FIG. 11) that can include a virtual cloud network (VCN) 1206 (e.g. the VCN 1106 of FIG. 11) and a secure host subnet 1208 (e.g. the secure host subnet 1108 of FIG. 11). The VCN 1206 can include a local peering gateway (LPG) 1210 (e.g. the LPG 1110 of FIG. 11) that can be communicatively coupled to a secure shell (SSH) VCN 1212 (e.g. the SSH VCN 1112 of FIG. 11) via an LPG 1110 contained in the SSH VCN 1212. The SSH VCN 1212 can include an SSH subnet 1214 (e.g. the SSH subnet 1114 of FIG. 11), and the SSH VCN 1212 can be communicatively coupled to a control plane VCN 1216 (e.g. the control plane VCN 1116 of FIG. 11) via an LPG 1210 contained in the control plane VCN 1216. The control plane VCN 1216 can be contained in a service tenancy 1219 (e.g. the service tenancy 1119 of FIG. 11), and the data plane VCN 1218 (e.g. the data plane VCN 1118 of FIG. 11) can be contained in a customer tenancy 1221 that may be owned or operated by users, or customers, of the system.

The control plane VCN 1216 can include a control plane DMZ tier 1220 (e.g. the control plane DMZ tier 1120 of FIG. 11) that can include LB subnet(s) 1222 (e.g. LB subnet(s) 1122 of FIG. 11), a control plane app tier 1224 (e.g. the control plane app tier 1124 of FIG. 11) that can include app subnet(s) 1226 (e.g. app subnet(s) 1126 of FIG. 11), a control plane data tier 1228 (e.g. the control plane data tier 1128 of FIG. 11) that can include database (DB) subnet(s) 1230 (e.g. similar to DB subnet(s) 1130 of FIG. 11). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134 of FIG. 11) that can be contained in the control plane VCN 1216, and the app subnet(s) 1226 can be communicatively coupled to the DB subnet(s) 1230 contained in the control plane data tier 1228 and a service gateway 1236 (e.g. the service gateway of FIG. 11) and a network address translation (NAT) gateway 1238 (e.g. the NAT gateway 1138 of FIG. 11). The control plane VCN 1216 can include the service gateway 1236 and the NAT gateway 1238.

The control plane VCN 1216 can include a data plane mirror app tier 1240 (e.g. the data plane mirror app tier 1140 of FIG. 11) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144 of FIG. 11). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146 of FIG. 11) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152 of FIG. 11) that can be communicatively coupled to public Internet 1254 (e.g. public Internet 1154 of FIG. 11). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156 of FIG. 11).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218, but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 8," may be located in Region 1 and in "Region 2." If a call to Deployment 8 is made by the service gateway 1236 contained in the control plane VCN 1216 located in Region 1, the call may be transmitted to Deployment 8 in Region 1. In this example, the control plane VCN 1216, or Deployment 8 in Region 1, may not be communicatively coupled to, or otherwise in communication with, Deployment 8 in Region 2.

Figure 13:
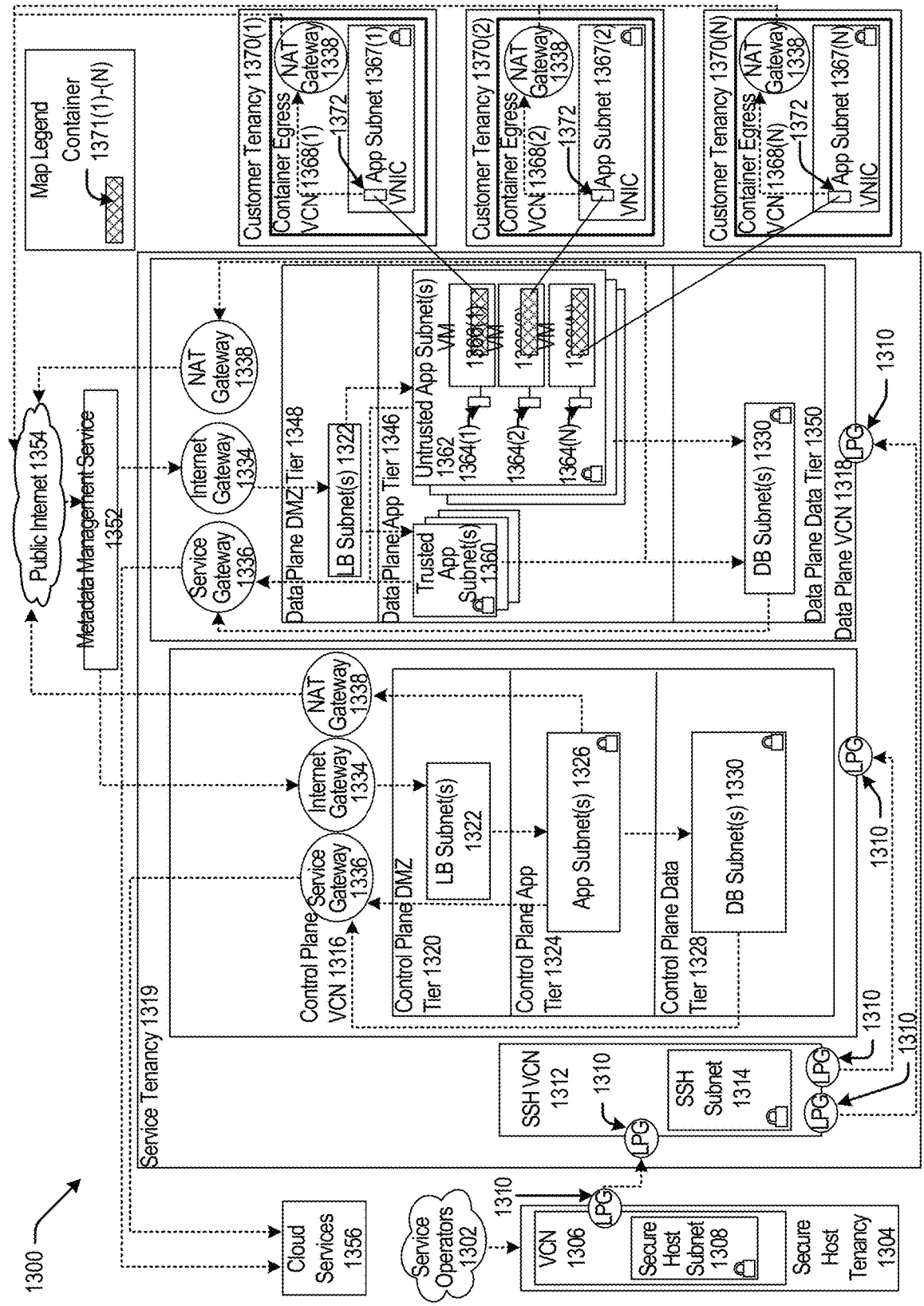
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1102 of FIG. 11) can be communicatively coupled to a secure host tenancy 1304 (e.g. the secure host tenancy 1104 of FIG. 11) that can include a virtual cloud network (VCN) 1306 (e.g. the VCN 1106 of FIG. 11) and a secure host subnet 1308 (e.g. the secure host subnet 1108 of FIG. 11). The VCN 1306 can include an LPG 1310 (e.g. the LPG 1110 of FIG. 11) that can be communicatively coupled to an SSH VCN 1312 (e.g. the SSH VCN 1112 of FIG. 11) via an LPG 1310 contained in the SSH VCN 1312. The SSH VCN 1312 can include an SSH subnet 1314 (e.g. the SSH subnet 1114 of FIG. 11), and the SSH VCN 1312 can be communicatively coupled to a control plane VCN 1316 (e.g. the control plane VCN 1116 of FIG. 11) via an LPG 1310 contained in the control plane VCN 1316 and to a data plane VCN 1318 (e.g. the data plane 1118 of FIG. 11) via an LPG 1310 contained in the data plane VCN 1318. The control plane VCN 1316 and the data plane VCN 1318 can be contained in a service tenancy 1319 (e.g. the service tenancy 1119 of FIG. 11).

The control plane VCN 1316 can include a control plane DMZ tier 1320 (e.g. the control plane DMZ tier 1120 of FIG. 11) that can include load balancer (LB) subnet(s) 1322 (e.g. LB subnet(s) 1122 of FIG. 11), a control plane app tier 1324 (e.g. the control plane app tier 1124 of FIG. 11) that can include app subnet(s) 1326 (e.g. similar to app subnet(s) 1126 of FIG. 11), a control plane data tier 1328 (e.g. the control plane data tier 1128 of FIG. 11) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134 of FIG. 11) that can be contained in the control plane VCN 1316, and the app subnet(s) 1326 can be communicatively coupled to the DB subnet(s) 1330 contained in the control plane data tier 1328 and to a service gateway 1336 (e.g. the service gateway of FIG. 11) and a network address translation (NAT) gateway 1338 (e.g. the NAT gateway 1138 of FIG. 11). The control plane VCN 1316 can include the service gateway 1336 and the NAT gateway 1338.

The data plane VCN 1318 can include a data plane app tier 1346 (e.g. the data plane app tier 1146 of FIG. 11), a data plane DMZ tier 1348 (e.g. the data plane DMZ tier 1148 of FIG. 11), and a data plane data tier 1350 (e.g. the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154 of FIG. 11).

The Internet gateway 1334 contained in the control plane VCN 1316 and contained in the data plane VCN 1318 can be communicatively coupled to a metadata management service 1352 (e.g. the metadata management system 1152 of FIG. 11) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 14:
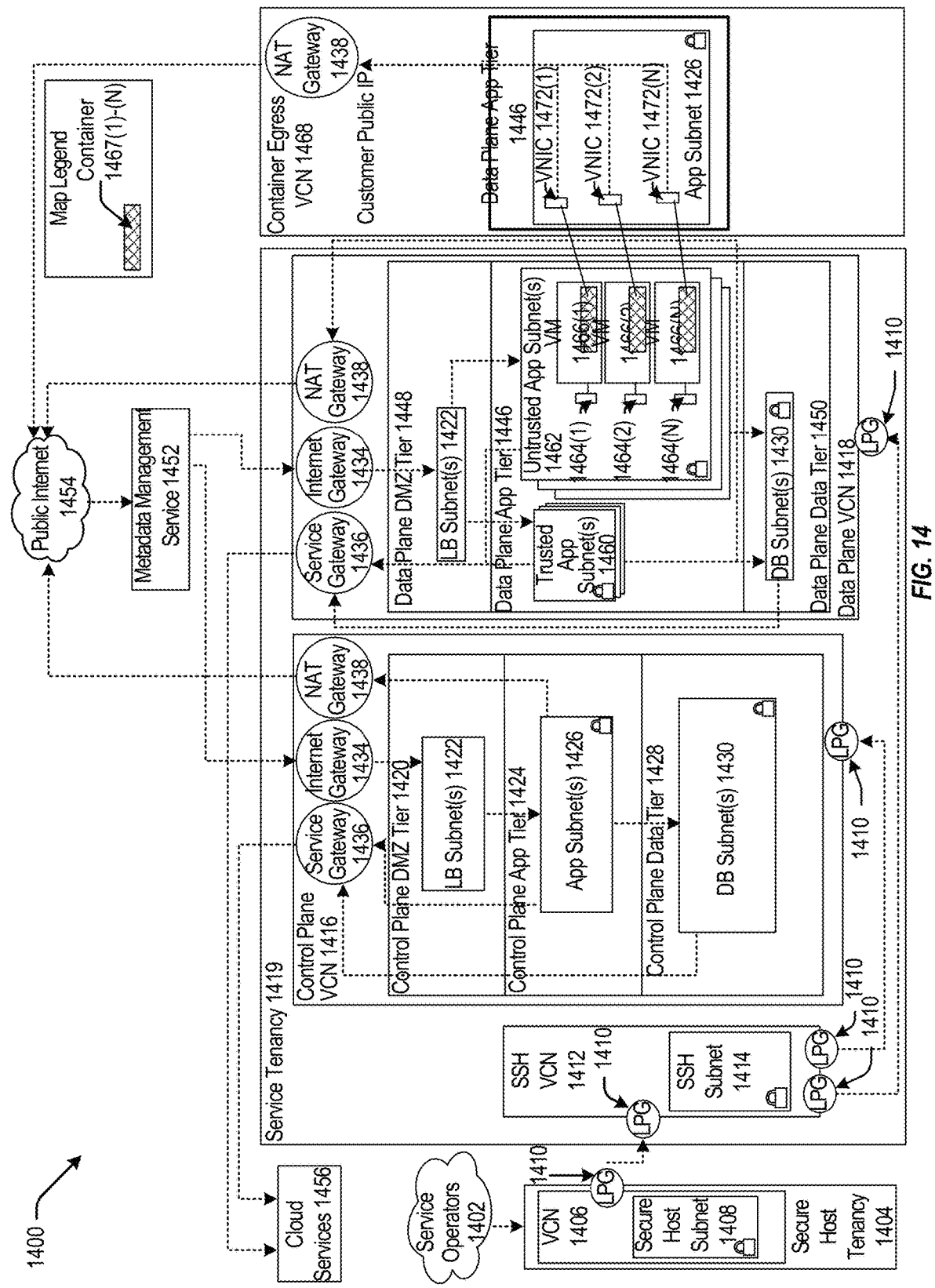
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1102 of FIG. 11) can be communicatively coupled to a secure host tenancy 1404 (e.g. the secure host tenancy 1104 of FIG. 11) that can include a virtual cloud network (VCN) 1406 (e.g. the VCN 1106 of FIG. 11) and a secure host subnet 1408 (e.g. the secure host subnet 1108 of FIG. 11). The VCN 1406 can include an LPG 1410 (e.g. the LPG 1110 of FIG. 11) that can be communicatively coupled to an SSH VCN 1412 (e.g. the SSH VCN 1112 of FIG. 11) via an LPG 1410 contained in the SSH VCN 1412. The SSH VCN 1412 can include an SSH subnet 1414 (e.g. the SSH subnet 1114 of FIG. 11), and the SSH VCN 1412 can be communicatively coupled to a control plane VCN 1416 (e.g. the control plane VCN 1116 of FIG. 11) via an LPG 1410 contained in the control plane VCN 1416 and to a data plane VCN 1418 (e.g. the data plane 1118 of FIG. 11) via an LPG 1410 contained in the data plane VCN 1418. The control plane VCN 1416 and the data plane VCN 1418 can be contained in a service tenancy 1419 (e.g. the service tenancy 1119 of FIG. 11).

The control plane VCN 1416 can include a control plane DMZ tier 1420 (e.g. the control plane DMZ tier 1120 of FIG. 11) that can include LB subnet(s) 1422 (e.g. LB subnet(s) 1122 of FIG. 11), a control plane app tier 1424 (e.g. the control plane app tier 1124 of FIG. 11) that can include app subnet(s) 1426 (e.g. app subnet(s) 1126 of FIG. 11), a control plane data tier 1428 (e.g. the control plane data tier 1128 of FIG. 11) that can include DB subnet(s) 1430 (e.g. DB subnet(s) 1330 of FIG. 13). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134 of FIG. 11) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 11) and a network address translation (NAT) gateway 1438 (e.g. the NAT gateway 1138 of FIG. 11). The control plane VCN 1416 can include the service gateway 1436 and the NAT gateway 1438.

The data plane VCN 1418 can include a data plane app tier 1446 (e.g. the data plane app tier 1146 of FIG. 11), a data plane DMZ tier 1448 (e.g. the data plane DMZ tier 1148 of FIG. 11), and a data plane data tier 1450 (e.g. the data plane data tier 1150 of FIG. 11). The data plane DMZ tier 1448 can include LB subnet(s) 1422 that can be communicatively coupled to trusted app subnet(s) 1460 (e.g. trusted app subnet(s) 1360 of FIG. 13) and untrusted app subnet(s) 1462 (e.g. untrusted app subnet(s) 1362 of FIG. 13) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154 of FIG. 11).

The Internet gateway 1434 contained in the control plane VCN 1416 and contained in the data plane VCN 1418 can be communicatively coupled to a metadata management service 1452 (e.g. the metadata management system 1152 of FIG. 11) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 14 may be considered an exception to the pattern illustrated by the architecture of block diagram 1300 of FIG. 13 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 15:
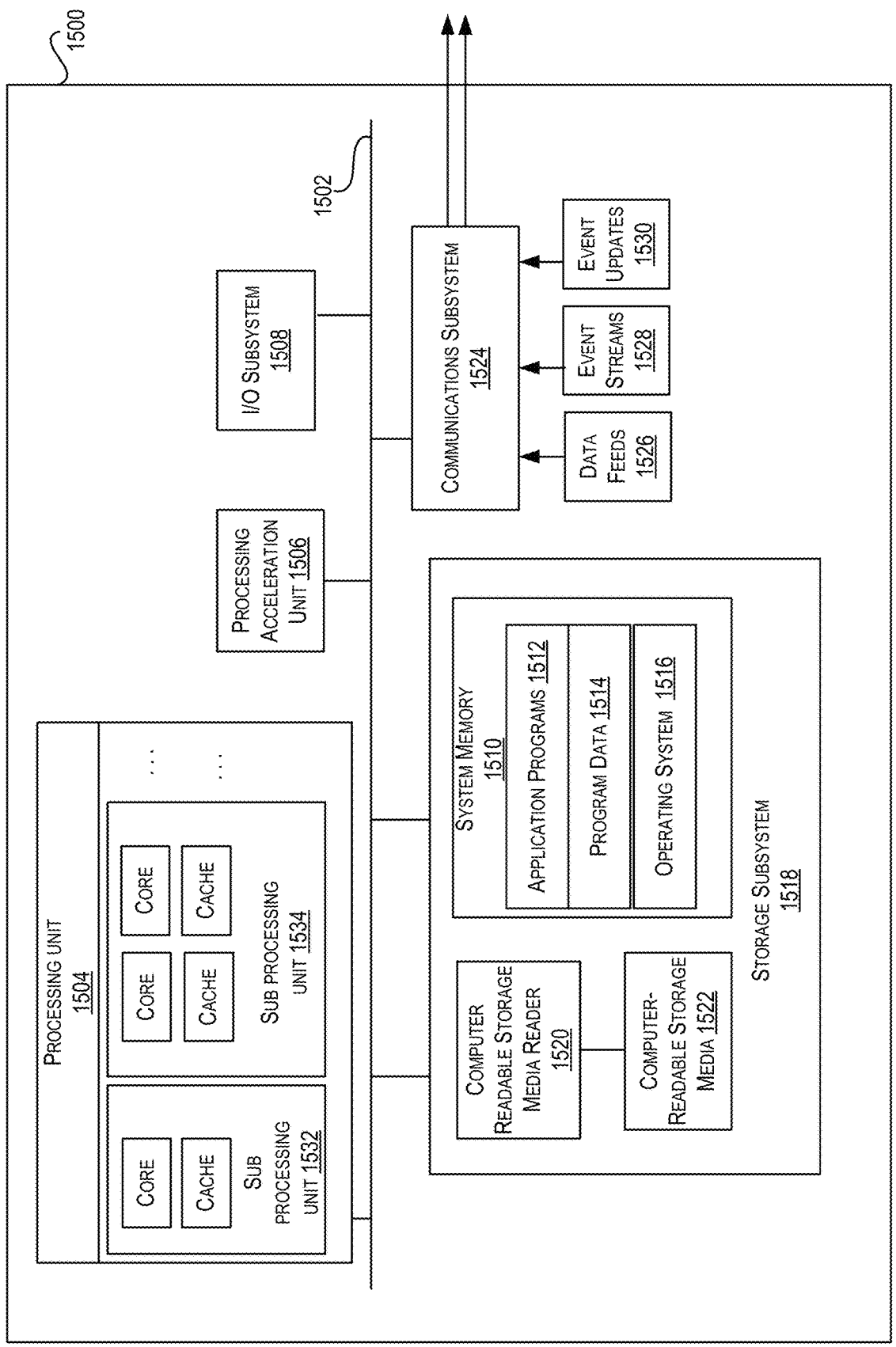
FIG. 15 is a block diagram illustrating an example computer system, according to at least one embodiment.

FIG. 15 illustrates an example computer system 1500, that may be used to implement various embodiments. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1513.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 15 OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with the present disclosure.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the claims is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the disclosed embodiments. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the claimed embodiments.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate certain embodiments and does not pose a limitation on the scope of the disclosed techniques. No language in the specification should be construed as indicating any non-claimed element as essential to the practice of the claimed embodiments.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments are described herein, including the best mode known for carrying out the various embodiments. Variations of those preferred embodiments may become apparent to those of ordinary skill in the art upon reading the foregoing description. Those of ordinary skill should be able to employ such variations as appropriate and the described embodiments may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, novel aspects are described with reference to specific embodiments thereof, but those skilled in the art will recognize that the disclosure is not limited thereto. Various features and aspects of the above-described embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:
1. A computer implemented method comprising:
  generating, by a data catalog system and based upon an original dataset and metadata information for the original dataset, catalog information for the original dataset, the catalog information for the original dataset com- prising information related to the original dataset and information usable for accessing the original dataset;

generating, by the data catalog system, a synthetic dataset based upon the original dataset and the metadata information for the original dataset, wherein the synthetic dataset is different than the original dataset;

generating, by the data catalog system, catalog information for the synthetic dataset, the catalog information for the synthetic dataset comprising information related to the synthetic dataset, information referencing the original dataset and information usable for accessing the synthetic dataset; and updating, by the data catalog system, the catalog information for the original dataset to include information referencing the synthetic dataset.

2. The method of claim 1, wherein the information referencing the original dataset includes information usable for accessing the original dataset.

3. The method of claim 1, wherein the information referencing the synthetic dataset includes information usable for accessing the synthetic dataset.

4. The method of claim 1, wherein generating the synthetic dataset comprises:

generating, by the data catalog system and based upon the original dataset, synthetic data and using one or more data generation techniques; and including the synthetic data in the synthetic dataset.

5. The method of claim 4, wherein the one or more data generation techniques include a machine-learning technique.

6. The method of claim 1, wherein generating the synthetic dataset comprises:

determining, by the data catalog system, that the original dataset comprises missing data;

generating, by the data catalog system and using one or more data generation techniques, synthetic data to fill in the missing data; and generating, by the data catalog system, the synthetic data set by including data from the original dataset in the synthetic dataset and filling in the missing data with the synthetic data in the synthetic dataset.

7. The method of claim 1, wherein generating the synthetic dataset comprises:

determining, by the data catalog system, that the original dataset comprises restricted data;

generating, by the data catalog system and using one or more data generation techniques, synthetic data to replace the restricted data; and generating, by the data catalog system, the synthetic data set by including data from the original dataset in the synthetic dataset and substituting the restricted data with the synthetic data in the synthetic dataset.

8. The method of claim 7, wherein the restricted data comprises at least one of personal identifiable information, data tagged as being restricted, or data that is restricted due to a rule.

9. The method of claim 1, wherein generating the synthetic dataset comprises:

generating, by the data catalog system and using one or more data generation techniques, synthetic data based upon the original dataset; and generating, by the data catalog system, the synthetic data set by including in the synthetic dataset the original dataset and the synthetic data.

10. The method of claim 1, wherein generating the synthetic dataset comprises:

generating, by the data catalog system and using one or more data generation techniques, synthetic data based upon the original dataset;

wherein the synthetic data is the synthetic dataset.

11. The method of claim 1 further comprising using the synthetic dataset to train a machine learning model.

12. The method of claim 1, wherein the data catalog system contains structured and unstructured data.

13. A computing system comprising:

one or more processors; and a memory including instructions that, when executed by the one or more processors, cause the computing system to perform processing comprising:

generating, based upon an original dataset and metadata information for the original dataset, catalog information for the original dataset, the catalog information for the original dataset comprising information related to the original dataset and information usable for accessing the original dataset;

generating a synthetic dataset based upon the original dataset and the metadata information for the original dataset, wherein the synthetic dataset is different than the original dataset;

generating catalog information for the synthetic dataset, the catalog information for the synthetic dataset comprising information related to the synthetic dataset, information referencing the original dataset and information usable for accessing the synthetic dataset; and updating the catalog information for the original dataset to include information referencing the synthetic dataset.

14. The system of claim 13, wherein generating the synthetic dataset comprises:

generating, based upon the original dataset, synthetic data and using one or more data generation techniques; and including the synthetic data in the synthetic dataset.

15. The system of claim 13, wherein generating the synthetic dataset comprises:

determining that the original dataset comprises missing data;

generating, using one or more data generation techniques, synthetic data to fill in the missing data; and generating the synthetic data set by including data from the original dataset in the synthetic dataset and filling in the missing data with the synthetic data in the synthetic dataset.

16. The system of claim 13, wherein generating the synthetic dataset comprises:

determining that the original dataset comprises restricted data;

generating, using one or more data generation techniques, synthetic data to replace the restricted data; and generating the synthetic data set by including data from the original dataset in the synthetic dataset and substituting the restricted data with the synthetic data in the synthetic dataset.

17. The system of claim 13, wherein generating the synthetic dataset comprises:

generating, using one or more data generation techniques, synthetic data based upon the original dataset; and generating the synthetic data set by including in the synthetic dataset the original dataset and the synthetic data.

18. The system of claim 13, wherein generating the synthetic dataset comprises:

generating, using one or more data generation techniques, synthetic data based upon the original dataset;

wherein the synthetic data is the synthetic dataset.

19. A non-transitory computer-readable medium storing a plurality of instructions executable by one or more processors, and when executed by the one or more processors cause the one or more processors to perform processing comprising:
- generating, by a data catalog system and based upon an original dataset and metadata information for the original dataset, catalog information for the original dataset, the catalog information for the original dataset comprising information related to the original dataset and information usable for accessing the original dataset;
- generating, by the data catalog system, a synthetic dataset based upon the original dataset and the metadata information for the original dataset, wherein the synthetic dataset is different than the original dataset;
- generating, by the data catalog system, catalog information for the synthetic dataset, the catalog information for the synthetic dataset comprising information related to the synthetic dataset, information referencing the original dataset and information usable for accessing the synthetic dataset; and
- updating, by the data catalog system, the catalog information for the original dataset to include information referencing the synthetic dataset.

20. The non-transitory computer-readable medium of claim 19, wherein generating the synthetic dataset comprises:
- generating, by the data catalog system and based upon the original dataset, synthetic data and using one or more data generation techniques; and
- including the synthetic data in the synthetic dataset.

* * * * *

UNITED STATES PATENT AND TRADEMARK OFFICE
CERTIFICATE OF CORRECTION

PATENT NO. : 11,687,568 B2
APPLICATION NO. : 17/377603
DATED : June 27, 2023
INVENTOR(S) : Sankaranarayanan Page 1 of 1

It is certified that error appears in the above-identified patent and that said Letters Patent is hereby corrected as shown below:

On the Title Page

Column 1, under Assignee, Line 2, delete "(CA)" and insert -- CA (US) --, therefor.

Signed and Sealed this
Twenty-eighth Day of May, 2024

Katherine Kelly Vidal
*Director of the United States Patent and Trademark Office*